United States Patent
Jammer

(10) Patent No.: US 9,566,868 B2
(45) Date of Patent: Feb. 14, 2017

(54) REAL-TIME SYSTEM AND METHOD FOR TRACKING, LOCATING AND RECHARGING ELECTRIC VEHICLES IN TRANSIT

(75) Inventor: Daniel Jammer, Herzeliya Pituach (IL)

(73) Assignee: NATION-E LTD., Herzliyya (IL)

( * ) Notice: Subject to any disclaimer, the term of this patent is extended or adjusted under 35 U.S.C. 154(b) by 714 days.

(21) Appl. No.: 13/413,336

(22) Filed: Mar. 6, 2012

(65) Prior Publication Data

US 2012/0271758 A1   Oct. 25, 2012

Related U.S. Application Data

(63) Continuation-in-part of application No. 12/828,398, filed on Jul. 1, 2010, now abandoned.

(30) Foreign Application Priority Data

Dec. 31, 2011 (CN) .................... 2011 2 0575436 U

(51) Int. Cl.
*G06Q 20/00* (2012.01)
*B60L 11/18* (2006.01)
(Continued)

(52) U.S. Cl.
CPC ............ *B60L 11/1816* (2013.01); *B60L 1/006* (2013.01); *B60L 11/1824* (2013.01); *B60L 11/1848* (2013.01); *B60L 11/1877* (2013.01); *G07F 15/003* (2013.01); *G07F 15/005* (2013.01); *B60L 2200/26* (2013.01); *B60L 2200/36* (2013.01); *B60L 2230/34* (2013.01); *B60L 2240/70* (2013.01); *B60L 2240/72* (2013.01); *Y02T 10/7005* (2013.01); *Y02T 10/705* (2013.01);
(Continued)

(58) Field of Classification Search
None
See application file for complete search history.

(56) References Cited

U.S. PATENT DOCUMENTS 4,617,506 A * 10/1986 Bogie et al. ................... 320/105
5,202,617 A *  4/1993 Nor .............................. 320/130
(Continued)

FOREIGN PATENT DOCUMENTS

CN   201371765   12/2009
FR   2872470    1/2006
(Continued)

OTHER PUBLICATIONS

Office action for corresponding EP application No. 10168112, mailed Oct. 15, 2013.
(Continued)

*Primary Examiner* — Fateh M Obaid
(74) *Attorney, Agent, or Firm* — Graeser Associates International Inc; Dvorah Graeser

(57) ABSTRACT

The present invention provides computer-controlled electric battery charging systems and methods for charging a battery of a roaming electric vehicle, the system comprising an electric vehicle comprising at least one battery, a master charger vehicle comprising a master battery module and a control system in communication with the at least one electric vehicle and the master charger vehicle to enable the master charger vehicles to reach the electric vehicle, wherein the master battery module is adapted to charge the at least one battery.

29 Claims, 14 Drawing Sheets

(51) Int. Cl.
  *G07F 15/00* (2006.01)
  *B60L 1/00* (2006.01)
(52) U.S. Cl.
  CPC ......... *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(56) References Cited

U.S. PATENT DOCUMENTS

| | | | |
|---|---|---|---|
| 5,323,099 A * | 6/1994 | Bruni et al. | 320/108 |
| 5,548,200 A | 8/1996 | Nor et al. | |
| 5,573,090 A * | 11/1996 | Ross | 191/10 |
| 5,963,013 A | 10/1999 | Watson et al. | |
| 6,339,736 B1 | 1/2002 | Moskowitz et al. | |
| 6,826,460 B2 | 11/2004 | Kittell et al. | |
| 6,963,186 B2 * | 11/2005 | Hobbs | 320/128 |
| 7,602,143 B2 | 10/2009 | Capizzo | |
| 7,619,319 B1 | 11/2009 | Hunter | |
| 8,384,358 B2 * | 2/2013 | Biondo et al. | 320/155 |
| 2009/0082957 A1 | 3/2009 | Agassi et al. | |
| 2009/0114463 A1 * | 5/2009 | DeVault | 180/65.29 |
| 2009/0192660 A1 * | 7/2009 | Tamor et al. | 701/22 |
| 2009/0312903 A1 | 12/2009 | Hafner et al. | |
| 2010/0049737 A1 | 2/2010 | Ambrosio et al. | |
| 2010/0065344 A1 * | 3/2010 | Collings, III | 180/2.1 |
| 2010/0071979 A1 | 3/2010 | Heichal et al. | |
| 2010/0289451 A1 * | 11/2010 | Tuffner et al. | 320/109 |
| 2011/0025267 A1 | 2/2011 | Kamen et al. | |
| 2011/0055037 A1 * | 3/2011 | Hayashigawa et al. | 705/26.1 |
| 2011/0191186 A1 * | 8/2011 | Levy et al. | 705/14.58 |
| 2011/0251935 A1 | 10/2011 | German et al. | |
| 2011/0295444 A1 * | 12/2011 | Westra et al. | 701/1 |
| 2013/0221918 A1 * | 8/2013 | Hill et al. | 320/109 |

FOREIGN PATENT DOCUMENTS

| | | |
|---|---|---|
| GB | 2460500 A | 12/2009 |
| JP | 2009213337 | 9/2009 |
| JP | 2010035333 | 2/2010 |
| WO | WO2010031687 | 3/2010 |

OTHER PUBLICATIONS

Written opinion for parent PCT application No. PCT/IL2011/000519, mailed Dec. 5, 2011.

Office action for corresponding IL application No. 206824, mailed Mar. 27, 2011, plus summary translation.

* cited by examiner

REAL-TIME SYSTEM AND METHOD FOR TRACKING, LOCATING AND RECHARGING ELECTRIC VEHICLES IN TRANSIT

This application is a Continuation-in-Part of, and claims priority from, U.S. Ser. No. 12/828,398, filed on 1 Jul. 2010 now abandoned, and is also a Continuation-in-Part of, and claims priority from, Chinese Utility Model No. 201120575436.5, filed on Dec. 31, 2011, all of which are hereby incorporated by reference as if fully set forth herein.

FIELD OF THE INVENTION

The present invention relates generally to electric vehicles, and more specifically to systems and methods for charging batteries of electric vehicles in transit.

BACKGROUND OF THE INVENTION

Over the last decade, there have been major strides to develop battery-driven electric vehicles for land, sea and air travel. These vehicles are aimed to reduce the pollution from current vehicles, as well as reducing dependence on fossil fuels.

One major limitation of current electric vehicles is that their batteries provide enough power only for short trips of typically less than 100 kilometers. Moreover, current battery charging techniques are slow and time-consuming, increasing both the journey time and the dependency on charging stations.

Another problem is that the power may be used up in traffic jams, air-conditioning and heating of the vehicle and the actual distance travelable by the vehicle without charging may be significantly less than the original estimate. These disadvantages render electric vehicles impractical and uneconomic.

Some attempts to overcome these problems have been published in several published patent applications. A first group of patent applications relates to static charging stations.

US Patent Application Publication No. US2010071979 to Agassi et al., describes an electric vehicle including a battery pack that can be exchanged at a battery exchange station. At the battery exchange station, an at least partially spent battery pack is exchanged for an at least partially charged battery pack. A battery bay is configured to be disposed at an underside of the electric vehicle. The battery bay includes a frame which defines a cavity. The cavity is configured to at least partially receive the battery pack therein. The battery bay comprises at least one latch rotatably pivoted about an axis substantially parallel with a plane formed by the underside of the vehicle. The latch is configured to lift, retain the battery pack at least partially within the cavity.

US Patent Application Publication No. US2009082957, to Agassi et al., discloses an electric vehicle that includes an electric motor that drives one or more wheels of the vehicle and is powered by a battery. The electric vehicle determines a status of a battery of the vehicle and a geographic location of the vehicle. The electric vehicle then identifies at least one battery service station that the vehicle can reach based on the charge status of the battery of the vehicle and the geographic location of the vehicle. The electric vehicle displays the at least one battery service station to a user of the vehicle.

British Patent Application Publication No. GB2460500, to Mayer et al., discloses a system for improved and more efficient recharging of electric cars, by using improved batteries, improved recharger arrangements in electric cars, and infrastructures that are used for recharging electric cars, while also protecting the electric grid from overload. This is done for example by accumulating energy in service stations in special high speed capacitors, such as one or more super capacitors, or one or more molten salt accumulators, or other fast batteries which can be recharged to 80 percent capacity within 5 minutes. These accumulators can be used to recharge cars, since otherwise the service station would need to have a huge capacity power supply to enable such fast recharges. Other variations include efficient methods of recharging the batteries serially, either in the service station (based on a model of fast replacement of batteries at the service station), after automatically sorting the batteries into more or less homogeneous groups, or in the car itself by automatically rerouting the batteries, or some of them, or elements in them, during recharge so that they are recharged more serially than during the normal operation of the car. This enables recharge with fewer rechargers at higher voltages and with less current and fewer problems of heat during recharge. Other improvements include a system wherein when recharging the electric cars, rechargers and central computers in the electrical grid company and in the service provider take into account car-specific parameters in order to optimize the recharging priorities, for example based on the state of their batteries and heuristics or statistics or automatic repeated identification of cars based on a unique digital ID number. The system can take into account also various regular or historical car-specific parameters or patterns or statistics, such as typical arrival and departure times, typical distances traveled, specific needs based on week days, etc. Other features include a system and method for alerting users when a parking and recharging post becomes available or reserving them in advance.

French Patent Application Publication No. FR2872470A1 discloses an automatic self-service station for e.g. electric car, has charging hoists for batteries, jack on loading modules to level plate for displacement perpendicular to plate that rotates to put or remove car battery, and cabinet with a payment desk. The station has two charging hoists for batteries, walls which support the hoists, and a roof. A repair pit has loading modules and a staircase permits maintenance service. A jack on the module levels a plate for a displacement perpendicular to another plate which rotates to put or remove the battery of a car. A cabinet has a control and payment desk placed to the side of a car driver.

All the above publications rely on the electric car being able to reach the service station at a fixed location or having a battery replacement service. Moreover, the aforementioned patent publications rely on complex methods for replacing batteries, which require stocks of partially or fully charged batteries and sophisticated systems for removing the at least partially depleted battery (or batteries) and replacing it/them with at least one at least partially charged battery.

Other systems have been developed to financial systems for billing an electric vehicle user for charging of his car battery or battery pack at stationary service stations.

WO10031687A discloses a method and a device for the location-independent power intake of and/or location-independent power feed by a mobile storage and consumption unit at a stationary electric vehicle charging station. The method comprises at least the steps of producing a first communication link between the storage and consumption unit and the electric vehicle charging station when the mobile storage and consumption unit spatially approaches a stationary electric vehicle charging station, a unique ID number being allocated to the storage and consumption unit and the electric vehicle charging station having an electricity counter with a counter number, transmitting a data packet which contains at least the ID number and the counter number via a second communication link to a billing server, allocating the storage and consumption unit to a power supplier using the ID number and allocating the electricity counter to a distribution network operator using the counter number and using the respective data stored on the billing server, clearing the electric vehicle charging station upon successful allocation on the billing server, supplying power to the storage and consumption unit or feeding power from the storage and consumption unit to the electric vehicle charging station and transmitting the quantity of electricity withdrawn from or fed into the electric vehicle charging station to the billing server via the communication link.

US Patent Application Publication No. US2009312903A to IBM et al., discloses a computer implemented method, apparatus, and computer usable program product for managing user preferences associated with charging transactions for electric vehicles. In one embodiment, a set of principals associated with a charging transaction for an electric vehicle is identified in response to receiving a request for a set of preferences from an energy transaction planner. The vehicle preference service is located on the electric vehicle. The set of preferences are retrieved from a plurality of preferences. The set of preferences comprises a subset of preferences for each principal in the set of principals. A preference in the set of preferences specifies a parameter of the charging transaction that is to be minimized, maximized, or optimized. The set of preferences are sent to an energy transaction planner.

US Patent Application Publication No. US2010049737A to IBM et al., discloses a computer implemented method, apparatus, and computer usable program code for managing electric vehicle charging information. In one embodiment, the process receives charging process data. The charging process data may be stored in a data repository and associated with a user to form historical user data. The process then generates a notification in response to detecting a condition for triggering the generation of the notification. The notification comprises a set of recommendations for achieving a set of optimization objectives. In addition, the set of recommendations are derived from at least one of the historical user data and a remote data source. Thereafter, the process presents the notification to a user using a set of notification preferences.

Chinese Patent Application CN201371765 describes an electric vehicle service truck with tools for servicing the vehicle and means for charging the battery of the electric vehicle.

U.S. patent application No. 20110025267 teaches a portable vehicle to recharge an electric car, which is controlled through a central control system, as does U.S. Pat. No. 7,619,319.

SUMMARY OF THE INVENTION

In order to make the use of electric vehicles practical and economic, there is still a need to provide solutions to electric vehicles which run out of power at a distance from a static service station. Additionally, it would be highly desirable to provide an electric vehicle battery charging system and method that addresses the above described drawbacks of the prior art systems.

According to at least some embodiments of the present invention, there is provided a system for tracking, locating and recharging batteries of electric vehicles in transit, which features mobile fast recharging capabilities, thereby overcoming the drawbacks of the above prior art references.

According to at least some embodiments of the present invention, mobile fast discharging capabilities are also preferably provided, for example in case of accident or other situation in which the battery or batteries of the electric vehicle need to be discharged rapidly. Optionally, a single mobile entity may feature both rapid charging and rapid discharging capabilities. Also optionally, the mobile entity may comprise a retrofitted vehicle.

In some embodiments of the present invention, an improved apparatus are provided for real-time tracking, locating and recharging batteries of electric vehicles in transit.

In other embodiments of the present invention, a system is described for providing a plurality of electric battery master charger vehicles.

In additional embodiments of the present invention, a system is described for deploying a plurality of electric battery master charger vehicles according to the requirements of a multiplicity of electric vehicles in transit.

In further embodiments of the present invention, a control system for deployment of electric battery master charger vehicles is provided.

In further embodiments of the present invention, a control system for deployment of electric breakdown master charger vehicles is provided.

There is thus provided according to an embodiment of the present invention, a computer-controlled electric battery charging system for charging a battery of a roaming electric vehicle, the system including;
  a) an electric vehicle including at least one battery of 1.5 to 200 kWh;
  b) a master charger vehicle including;
    i. a master battery module;
    ii. an electricity converter module adapted to convert output power from the master battery module to input power suitable for provision to the at least one battery; and
    iii. a connection and transfer module adapted to transfer the input power from the electricity converter module to the at least one battery; and
  c) a control system in communication with the at least one electric vehicle and the master charger vehicle to enable the master charger vehicle to reach the electric vehicle, wherein the master battery module is adapted to charge the at least one battery with the at least one battery disposed in the electric vehicle.

Additionally, according to an embodiment of the present invention, the electric vehicle is selected from the group consisting of an electric land vehicle, and electric water vehicle and an airborne electric vehicle.

Furthermore, according to an embodiment of the present invention, the electric land vehicle is selected from the group consisting of an electric motorbike, an electric car, an electric truck, an electric emergency vehicle and an electric army vehicle.

Moreover, according to an embodiment of the present invention, the electric water vehicle is selected from the group consisting of an electric boat, an electric yacht, an electric ship, an electric emergency water vehicle and an electric army water vehicle.

Additionally, according to an embodiment of the present invention, the master battery module includes a power rating of 7 to 3000 kWh.

Further, according to an embodiment of the present invention, the master charger vehicle further includes at least one of the following;

iv. a control system for controlling the master charger vehicle;
v. a communication display for displaying communications from at least one of the electric vehicle and the control center;
vi. a positioning system; and
vii. a mobile communication device.

Additionally, according to an embodiment of the present invention, the control system is constructed and configured to send instructions to the master charger vehicle to go to a position selected from the group consisting of;
a) a current position of the electric vehicle;
b) a future projected position of the electric vehicle along a predetermined route;
c) a future projected position of the electric vehicle, wherein the at least one battery is anticipated to be at least partially depleted; and
d) a future projected position of the electric vehicle, wherein the at least one battery is anticipated to be fully depleted.

Furthermore, according to an embodiment of the present invention, the computer-controlled electric battery charging system further includes a payment system to enable a user of an electric vehicle to pay for charging the at least one battery.

Moreover, according to an embodiment of the present invention, the payment system is further adapted to enable the user to pay for receiving of an electric vehicle to pay for charging the at least one battery.

Additionally, according to an embodiment of the present invention, the computer-controlled electric battery charging system further includes a breakdown vehicle.

Furthermore, according to an embodiment of the present invention, the breakdown vehicle includes;
a) an on-board master battery module adapted to charge the at least one battery; and
b) an electric vehicle transportation module adapted to convey the electric vehicle onto the transportation module and to transport the electric vehicle to a destination.

Additionally, according to an embodiment of the present invention, the breakdown vehicle further includes;
c) an electricity converter module adapted to convert output power from the master battery module to input power suitable for provision to the at least one battery; and
d) a connection and transfer module adapted to transfer the input power from the electricity converter module to the at least one battery.

Additionally, according to an embodiment of the present invention, the breakdown vehicle further includes at least one of the following;
i. a control system for controlling the master charger vehicle;
ii. a communication display for displaying communications from at least one of the electric vehicle and the control center;
iii. a positioning system; and
iv. a mobile communication device Additionally, according to an embodiment of the present invention, the computer-controlled electric battery charging system further includes at least one stationary service station.

Moreover, according to an embodiment of the present invention, the at least one stationary service station is adapted to charge the at least one battery.

There is thus provided according to another embodiment of the present invention, a computer-controlled electric battery charging method for charging a battery of a roaming electric vehicle, the method including;
a. receiving a communication from the roaming electric vehicle regarding a status of a battery of 1.5 to 200 kWh, of the electric vehicle;
b. sending one of a master charger vehicle and a breakdown vehicle, each including a master battery module to a suitable position associated with the electric vehicle; and
c. charging 70-100% of the battery, disposed inside the electric vehicle, using the master battery module within one hour.

Moreover, according to an embodiment of the present invention, the communication is selected from the group consisting of; an on-board alarm-transmitted communication; a control center communication; a user-transmitted communication; and a vehicle control system communication.

Additionally, according to an embodiment of the present invention, the electric vehicle is selected from the group consisting of an electric land vehicle, and electric water vehicle and an airborne electric vehicle.

Moreover, according to an embodiment of the present invention, the charging step includes;
i. feeding output power from the master battery module to an electricity converter module;
ii. converting output power from the master battery module to input power suitable for provision to the at least one battery; and
iii. transferring the input power from the electricity converter module to the at least one battery.

Furthermore, according to an embodiment of the present invention, the computer-controlled electric battery charging method further includes charging a user of the electric vehicle a fee for charging of the at least one battery.

Moreover, according to an embodiment of the present invention, the charging step is performed within twenty minutes.

There is thus provided according to a further embodiment of the present invention, a computer network system for controlling an electric battery charging system for charging a battery of a roaming electric vehicle, the computer system including;
a) a control center including;
   i. a computer system connected via at least one communication line via a public network to at least one of;
      a) a payment center;
      b) a stationary electric vehicle service station;
      c) an electric vehicle breakdown vehicle;
      d) a master battery vehicle;
      e) an electric vehicle;
b) an electric vehicle including at least one of;
   i. at least one display;
   ii. at least one battery control system;
   iii. at least one mobile location device; and
   iv. at least one mobile communication device; and
c) a master charger vehicle including;
   A) a master battery module;
   B) an electricity converter module adapted to convert output power from the master battery module to input power suitable for provision to the at least one battery; and C) a connection and transfer module adapted to transfer the input power from the electricity converter module to the at least one battery; and at least one of;
  i. at least one display;
  ii. at least one master battery control system;
  iii. at least one mobile location device; and
  iv. at least one mobile communication device;

wherein the control center is adapted to communicate with the electric vehicle and the master charger vehicle to enable the master charger vehicle to reach the electric vehicle, wherein the master battery module is adapted to charge 70-100% of the at least one battery inside the electric vehicle within one hour.

There is thus provided according to a further embodiment of the present invention, a computer software product for charging a battery of a roaming electric vehicle the product including a computer-readable medium in which program instructions are stored, which instructions, when read by a computer, cause the computer to;
  a) receive a communication from the roaming electric vehicle regarding a status of a battery of the electric vehicle;
  b) send one of a master charger vehicle and a breakdown vehicle, each including a master battery module to a suitable position associated with the electric vehicle; and
  c) charge 70-100% of the battery inside the electric vehicle using the master battery module within one hour.

There is thus provided according to an embodiment of the present invention, a computer-controlled electric battery charging system for charging a battery of a roaming electric vehicle, the system including;
  a. an electric vehicle including at least one battery;
  b. a master charger vehicle including a master battery module; and
  c. a control system in communication with the at least one electric vehicle and the master charger vehicle to enable the master charger vehicle to reach the electric vehicle, wherein the master battery module is adapted to charge the at least one battery.

According to some embodiments of the present invention, the electric vehicle is selected from the group consisting of an electric land vehicle, and electric water vehicle and an airborne electric vehicle.

Furthermore, according to some embodiments of the present invention, the electric land vehicle is selected from the group consisting of an electric motorbike, an electric car, an electric truck, an electric emergency vehicle and an electric army vehicle.

Additionally, according to some embodiments of the present invention, the electric water vehicle is selected from the group consisting of an electric boat, an electric yacht, an electric ship, an electric emergency water vehicle and an electric army water vehicle.

Moreover, according to some embodiments of the present invention, the master charger vehicle further includes;
  d. an electricity converter module adapted to convert output power from the master battery module to input power suitable for provision to the at least one battery; and
  e. a connection and transfer module adapted to transfer the input power from the electricity converter module to the at least one battery.

Additionally, according to some embodiments of the present invention, the master charger vehicle further includes at least one of the following;
  i. a control system for controlling the master charger vehicle;
  ii. a communication display for displaying communications from at least one of the electric vehicle and the control center;
  iii. a positioning system; and
  iv. a mobile communication device.

According to some embodiments of the present invention, the control system is constructed and configured to send instructions to the master charger vehicle to go to a position selected from the group consisting of;
  a. a current position of the electric vehicle;
  b. a future projected position of the electric vehicle along a predetermined route;
  c. a future projected position of the electric vehicle, wherein the at least one battery is anticipated to be at least partially depleted; and
  d. a future projected position of the electric vehicle, wherein the at least one battery is anticipated to be fully depleted.

According to some additional embodiments of the present invention, the computer-controlled electric battery charging system further includes a payment system to enable a user of an electric vehicle to pay for charging the at least one battery.

Yet further, according to some embodiments of the present invention, the payment system is further adapted to enable the user to pay for receiving of an electric vehicle to pay for charging the at least one battery.

According to some further embodiments of the present invention, the computer-controlled electric battery charging system further includes a breakdown vehicle.

According to some further embodiments of the present invention, the breakdown vehicle includes;
  a. an on-board master battery module adapted to charge the at least one battery; and
  b. an electric vehicle transportation module adapted to convey the electric vehicle onto the transportation module and to transport the electric vehicle to a destination.

Furthermore, according to some embodiments of the present invention, wherein the breakdown vehicle further includes;
  c. an electricity converter module adapted to convert output power from the master battery module to input power suitable for provision to the at least one battery; and
  d. a connection and transfer module adapted to transfer the input power from the electricity converter module to the at least one battery.

According to some embodiments of the present invention, the breakdown vehicle further includes at least one of the following;
  v. a control system for controlling the master charger vehicle;
  vi. a communication display for displaying communications from at least one of the electric vehicle and the control center;
  vii. a positioning system; and
  viii. a mobile communication device Additionally, according to some embodiments of the present invention, the computer-controlled electric battery charging system further includes at least one stationary service station.

Moreover, according to some embodiments of the present invention, the at least one stationary service station is adapted to charge the at least one battery.

There is thus provided according to some additional embodiments of the present invention, a computer-controlled electric battery charging method for charging a battery of a roaming electric vehicle, the method including;
 a. receiving a communication from the roaming electric vehicle regarding a status of a battery of the electric vehicle;
 b. sending one of a master charger vehicle and a breakdown vehicle, each including a master battery module to a suitable position associated with the electric vehicle; and
 c. charging the battery using the master battery module.

According to some embodiments of the present invention, the communication is selected from the group consisting of; an on-board alarm-transmitted communication; a control center communication; a user-transmitted communication; and a vehicle control system communication.

Additionally, according to some embodiments of the present invention, the electric vehicle is selected from the group consisting of an electric land vehicle, and electric water vehicle and an airborne electric vehicle.

According to some embodiments of the present invention, the charging step includes;
 a. feeding output power from the master battery module to an electricity converter module;
 b. converting output power from the master battery module to input power suitable for provision to the at least one battery; and
 c. transferring the input power from the electricity converter module to the at least one battery.

Furthermore, according to some embodiments of the present invention, the computer-controlled electric battery charging method further includes charging a user of the electric vehicle a fee for charging of the at least one battery.

There is thus provided according to some additional embodiments of the present invention, a computer network system for controlling an electric battery charging system for charging a battery of a roaming electric vehicle, the computer system including;
 a. a control center including;
  i. a computer system connected via at least one communication line via a public network to at least one of;
   1. a payment center;
   2. a stationary electric vehicle service station;
   3. an electric vehicle breakdown vehicle;
   4. a master battery vehicle;
   5. an electric vehicle;
 b. an electric vehicle including at least one of;
  i. at least one display;
  ii. at least one battery control system;
  iii. at least one mobile location device; and
  iv. at least one mobile communication device; and
 c. a master charger vehicle including at least one of;
  i. a master battery module;
  ii. at least one display;
  iii. at least one master battery control system;
  iv. at least one mobile location device; and
  v. at least one mobile communication device;
 wherein the control center is adapted to communicate with the electric vehicle and the master charger vehicle to enable the master charger vehicle to reach the electric vehicle, wherein the master battery module is adapted to charge the at least one battery.

There is thus provided according to some additional embodiments of the present invention, a computer software product for charging a battery of a roaming electric vehicle the product including a computer-readable medium in which program instructions are stored, which instructions, when read by a computer, cause the computer to;
 a. receive a communication from the roaming electric vehicle regarding a status of a battery of the electric vehicle;
 b. send one of a master charger vehicle and a breakdown vehicle, each including a master battery module to a suitable position associated with the electric vehicle; and
 c. charge the battery using the master battery module.

The present invention will be more fully understood from the following detailed description of the preferred embodiments thereof, taken together with the drawings.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a simplified pictorial illustration showing a system for tracking, locating and recharging electric vehicles, in accordance with an embodiment of the present invention;

FIG. 2A is a simplified pictorial illustration showing a master charging land vehicle (MV1), in accordance with an embodiment of the present invention;

FIG. 2B is a simplified pictorial illustration showing a master charging water vehicle (MW1), in accordance with an embodiment of the present invention;

FIG. 3A is a simplified block diagram showing further details of a master charging vehicle of FIG. 2A or 2B, in accordance with some embodiments of the present invention;

FIG. 3B shows an exemplary, non-limiting, illustrative method for fast charging or discharging according to at least some embodiments of the present invention;

Figure 1:
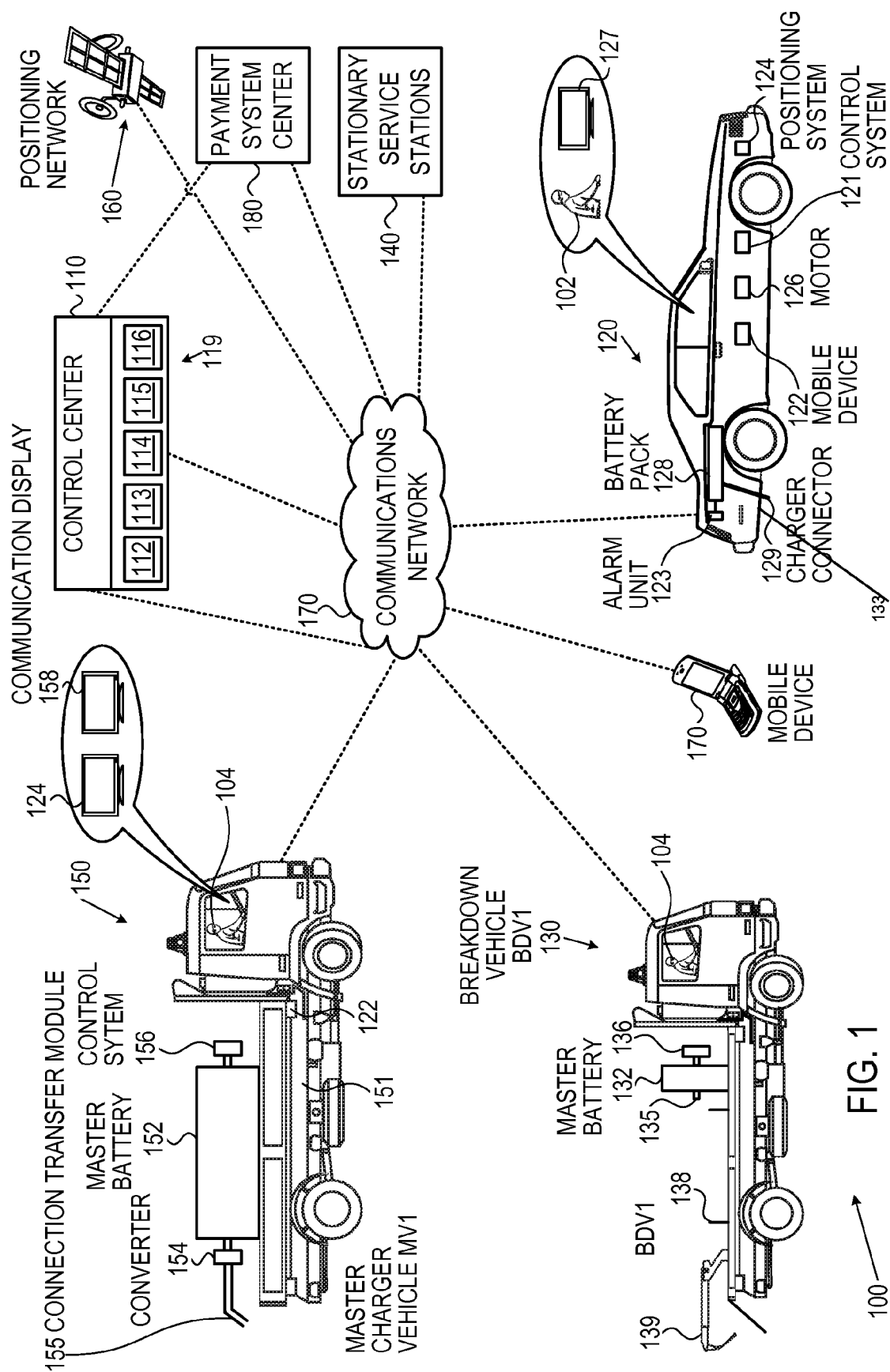
Figure 2A:
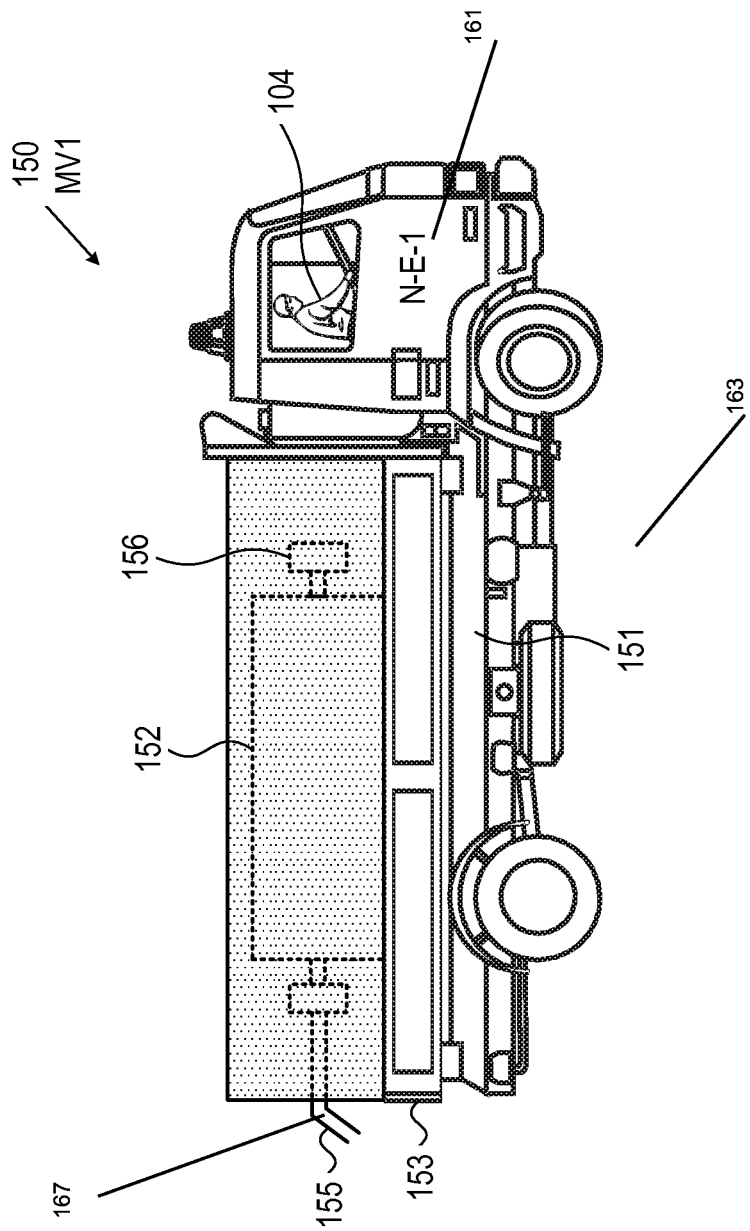
Figure 2B:
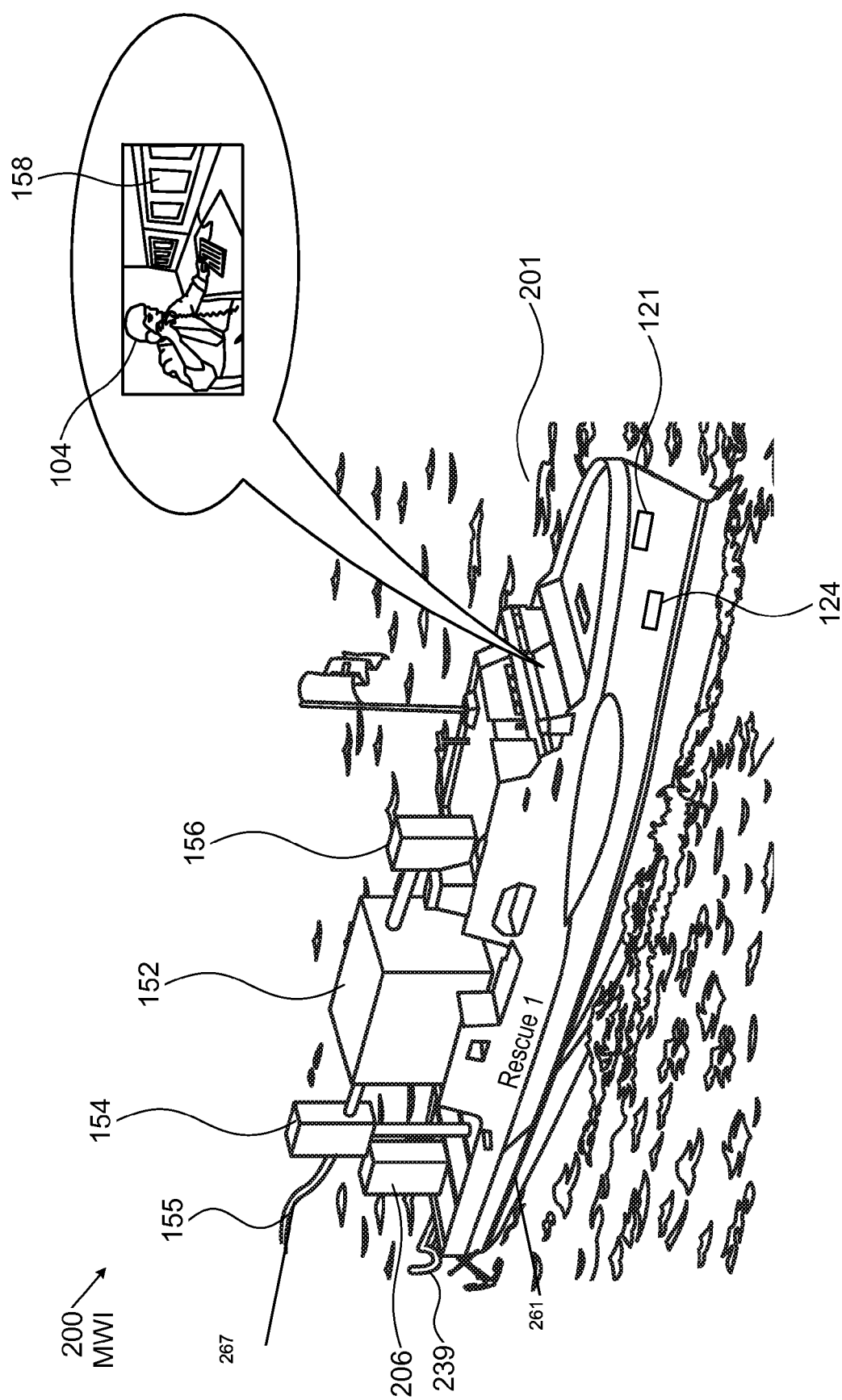
Figure 3A:
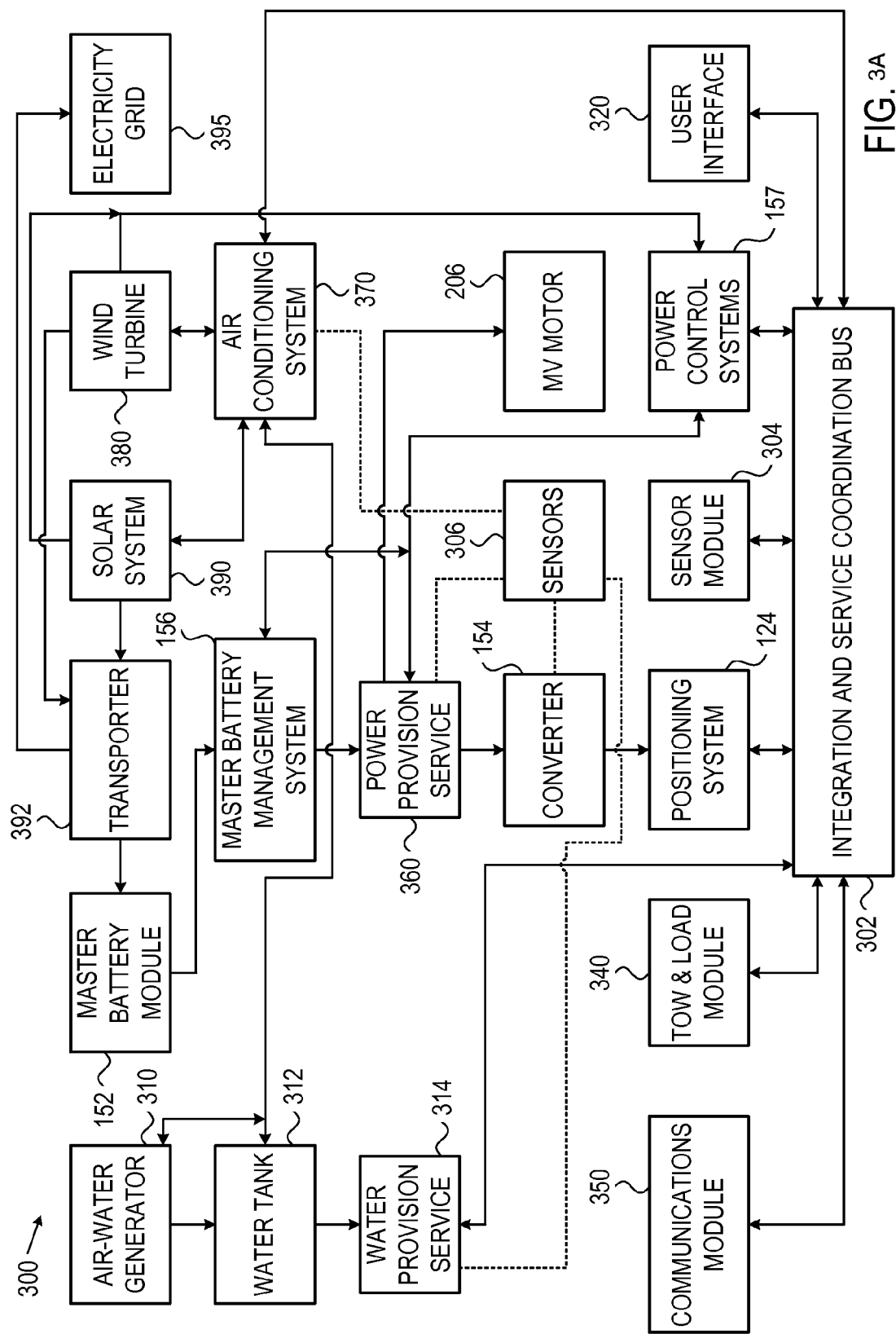
Figure 3B:
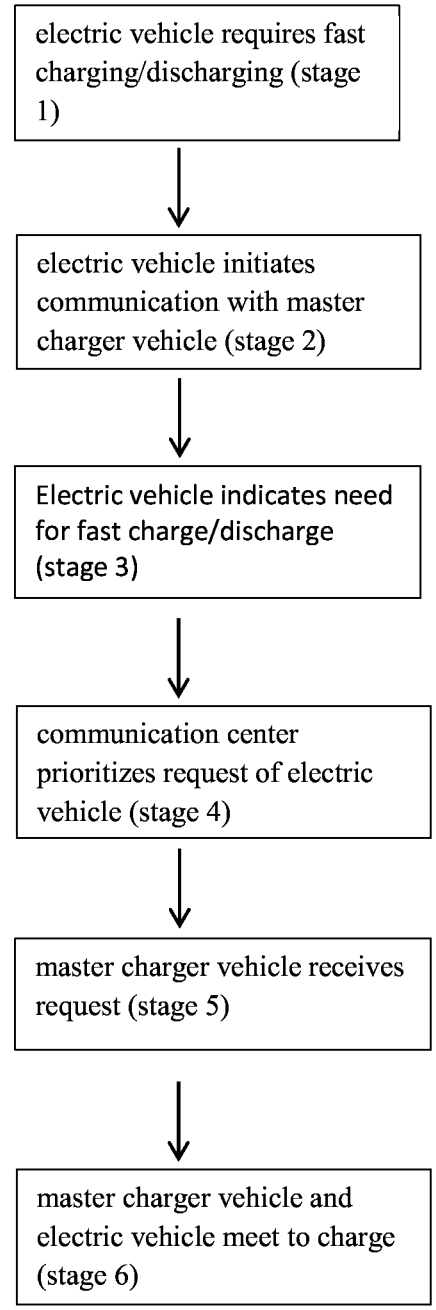
Figure 3C:
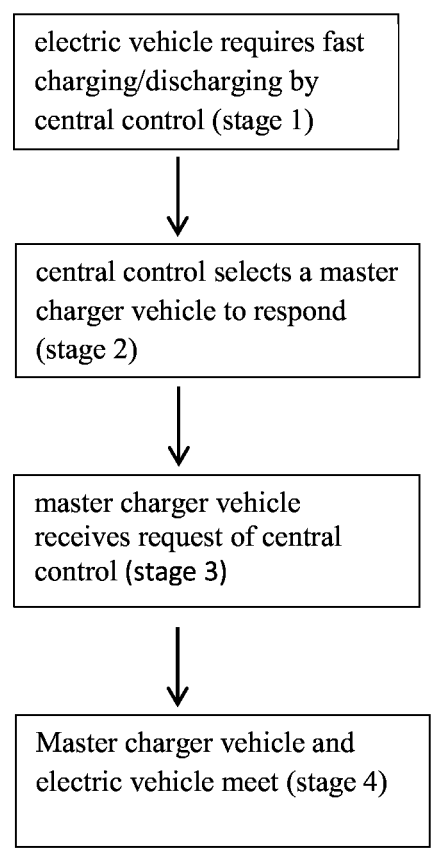
Figure 4:
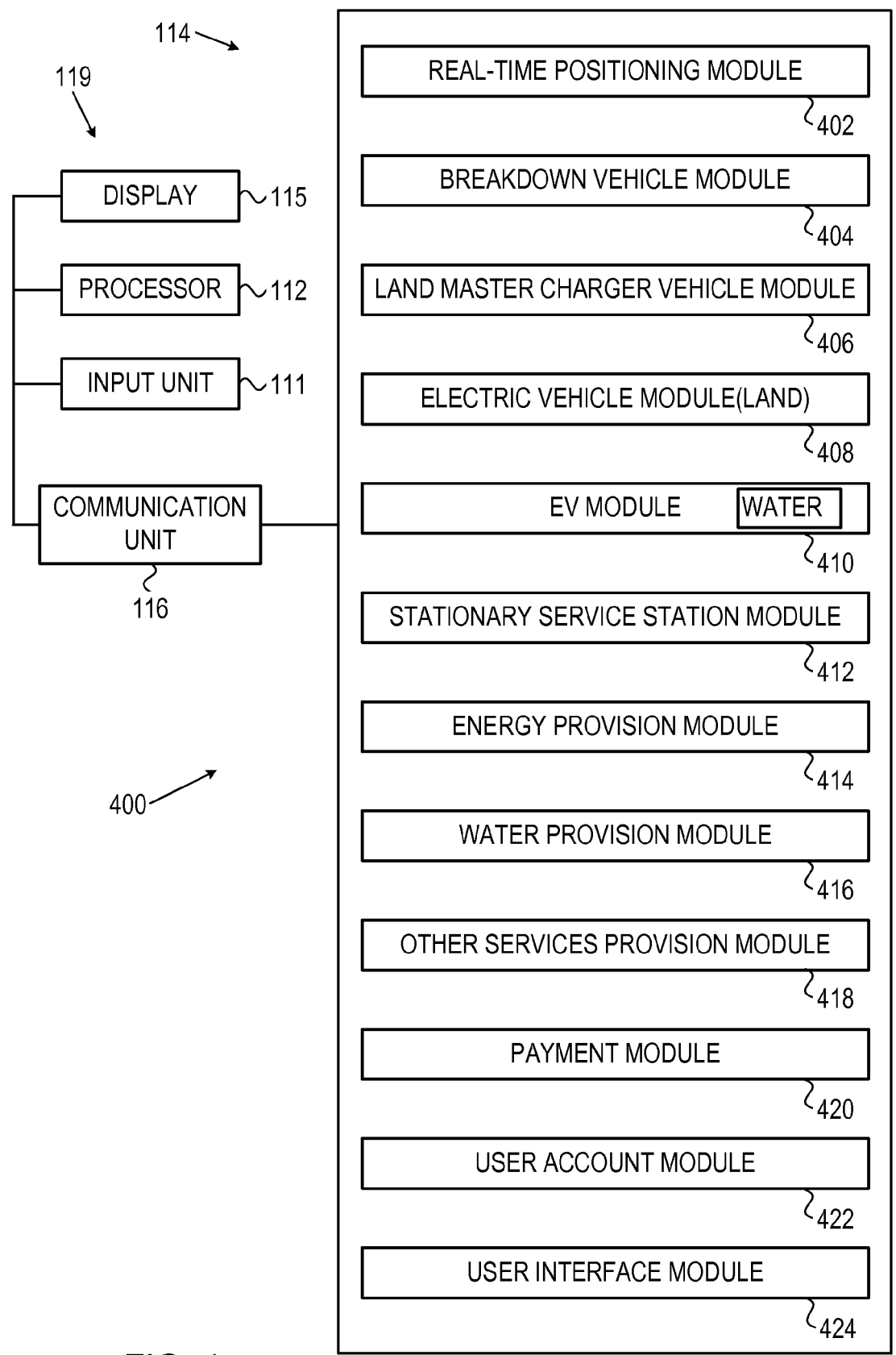
Figure 5A:
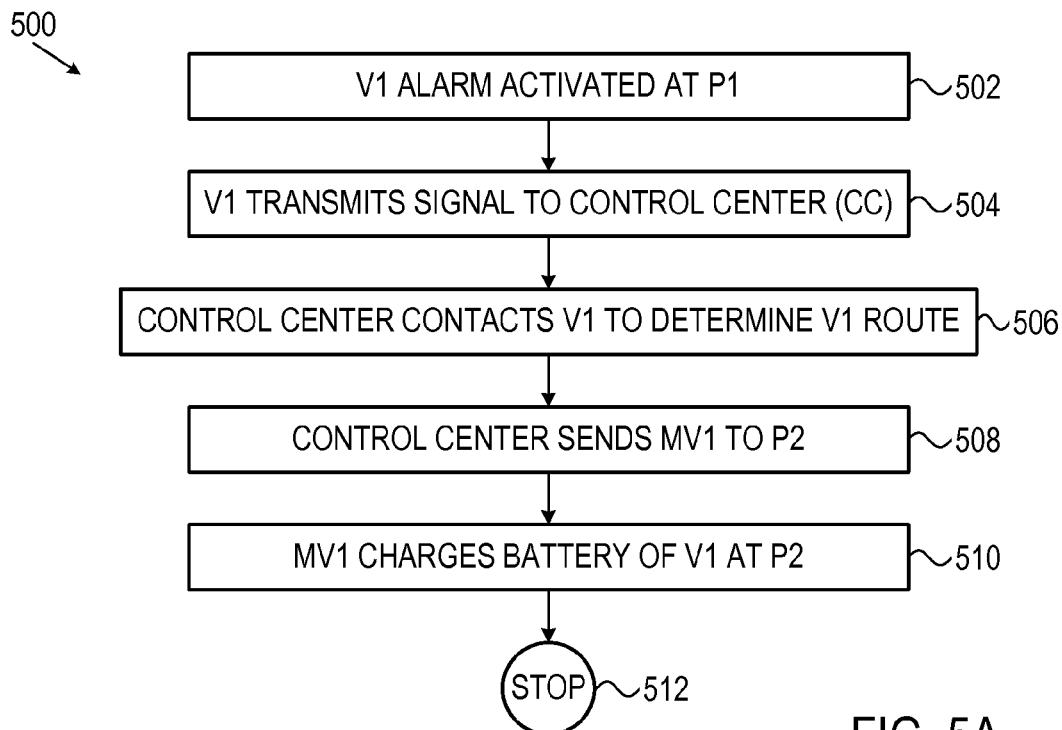
Figure 5B:
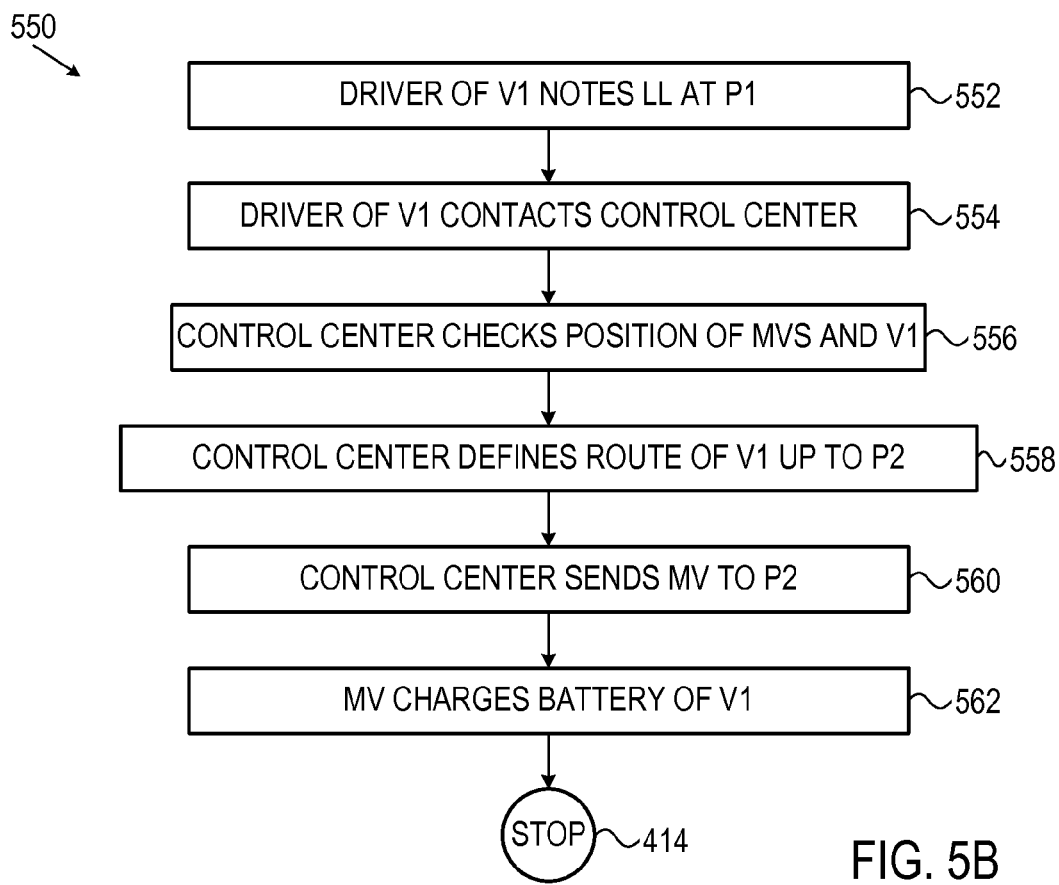
Figure 6:
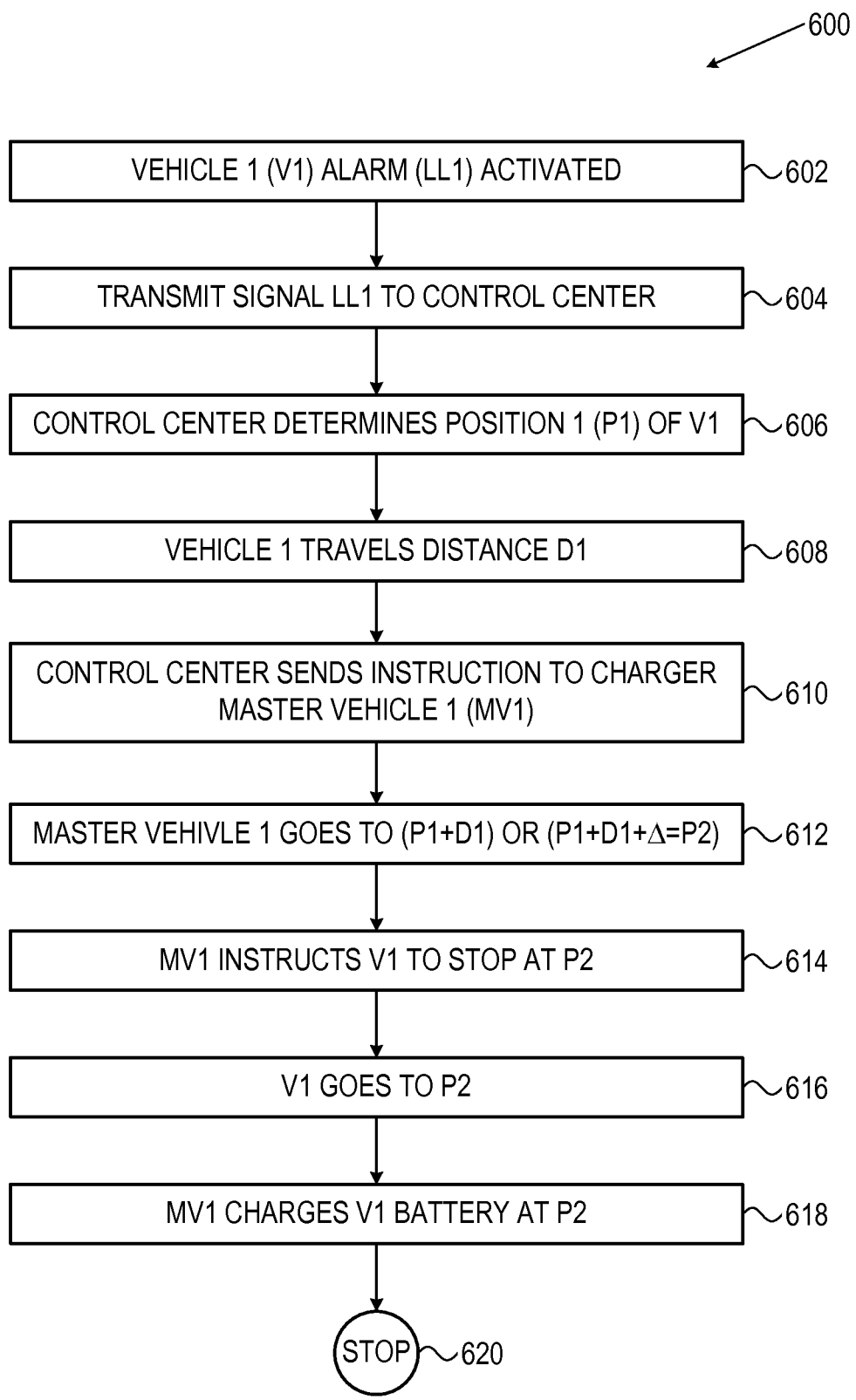
Figure 7:
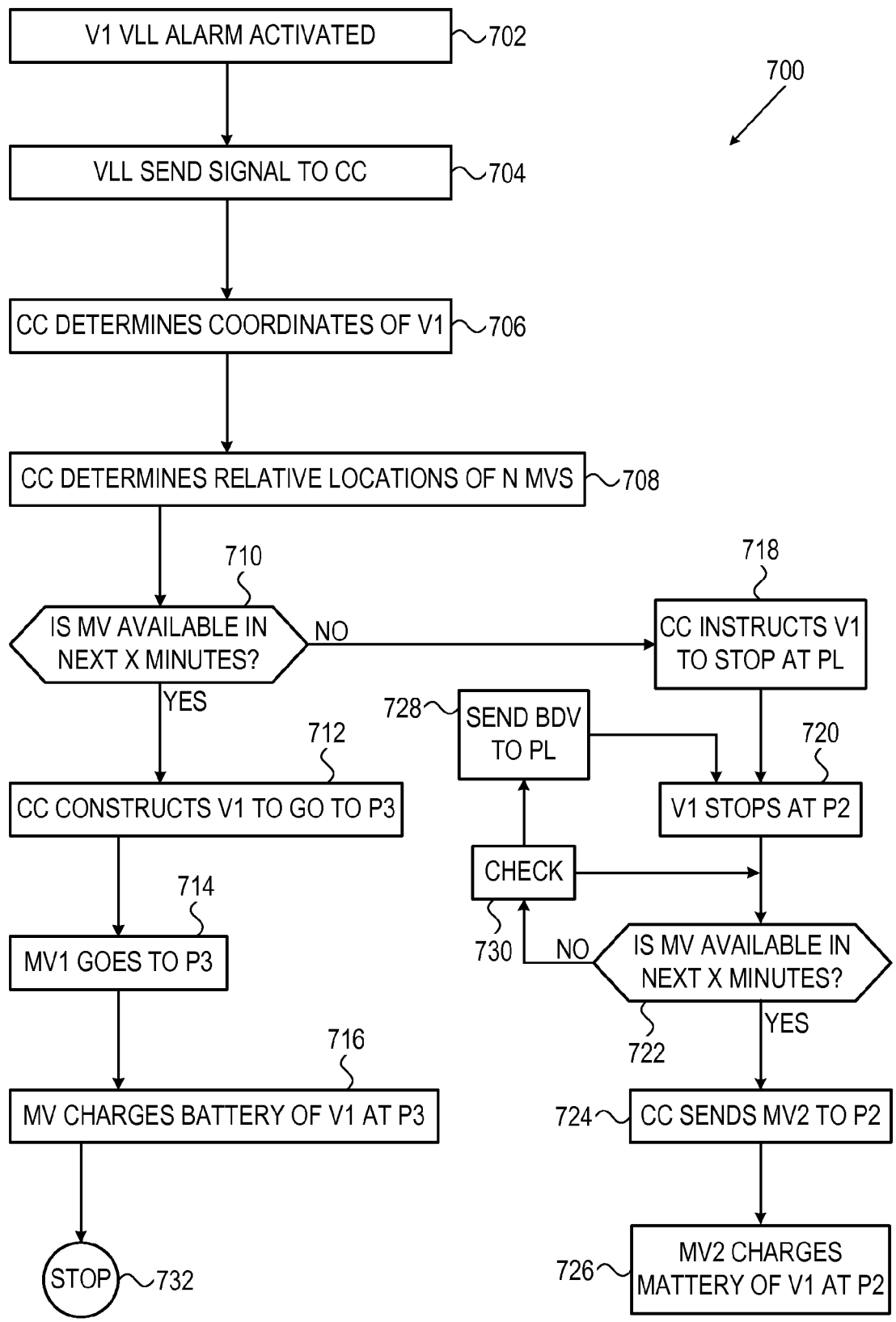
Figure 8:
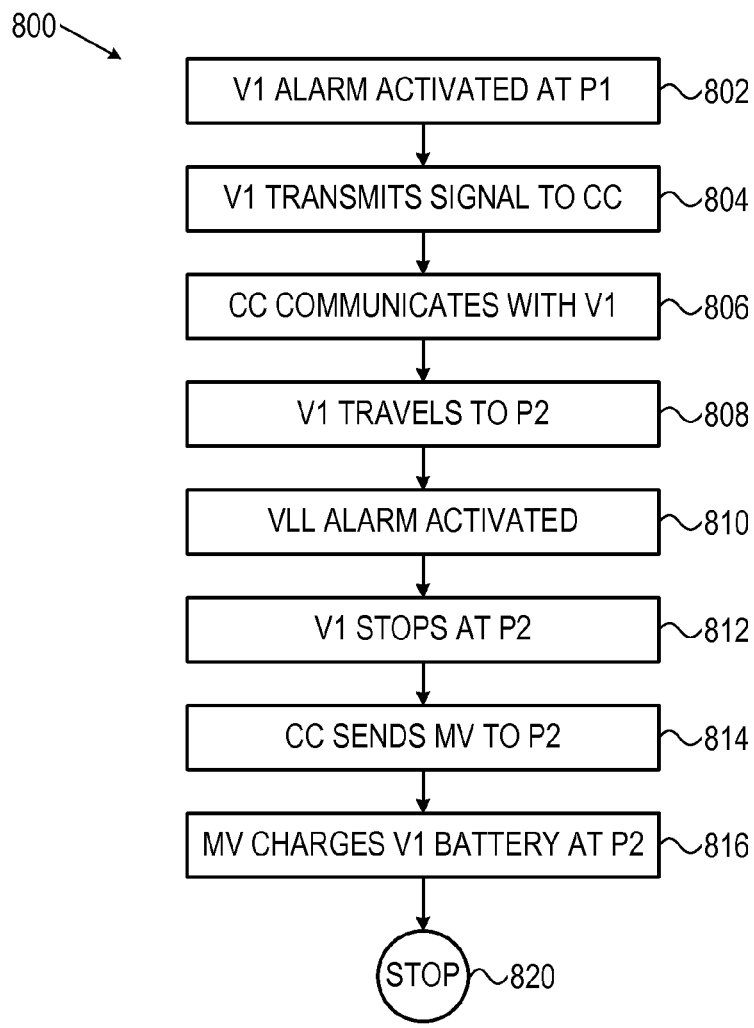
Figure 9:
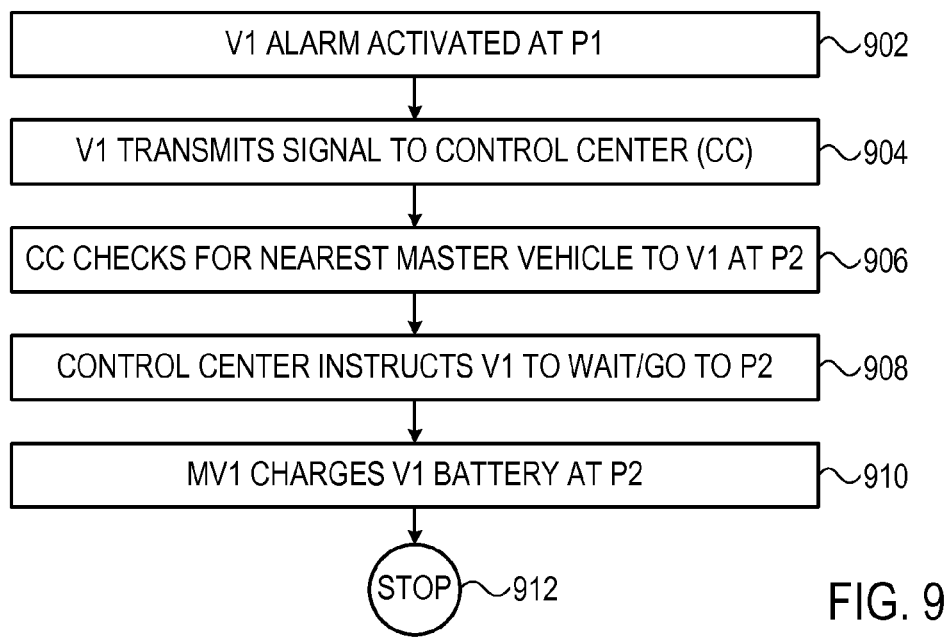
Figure 10:
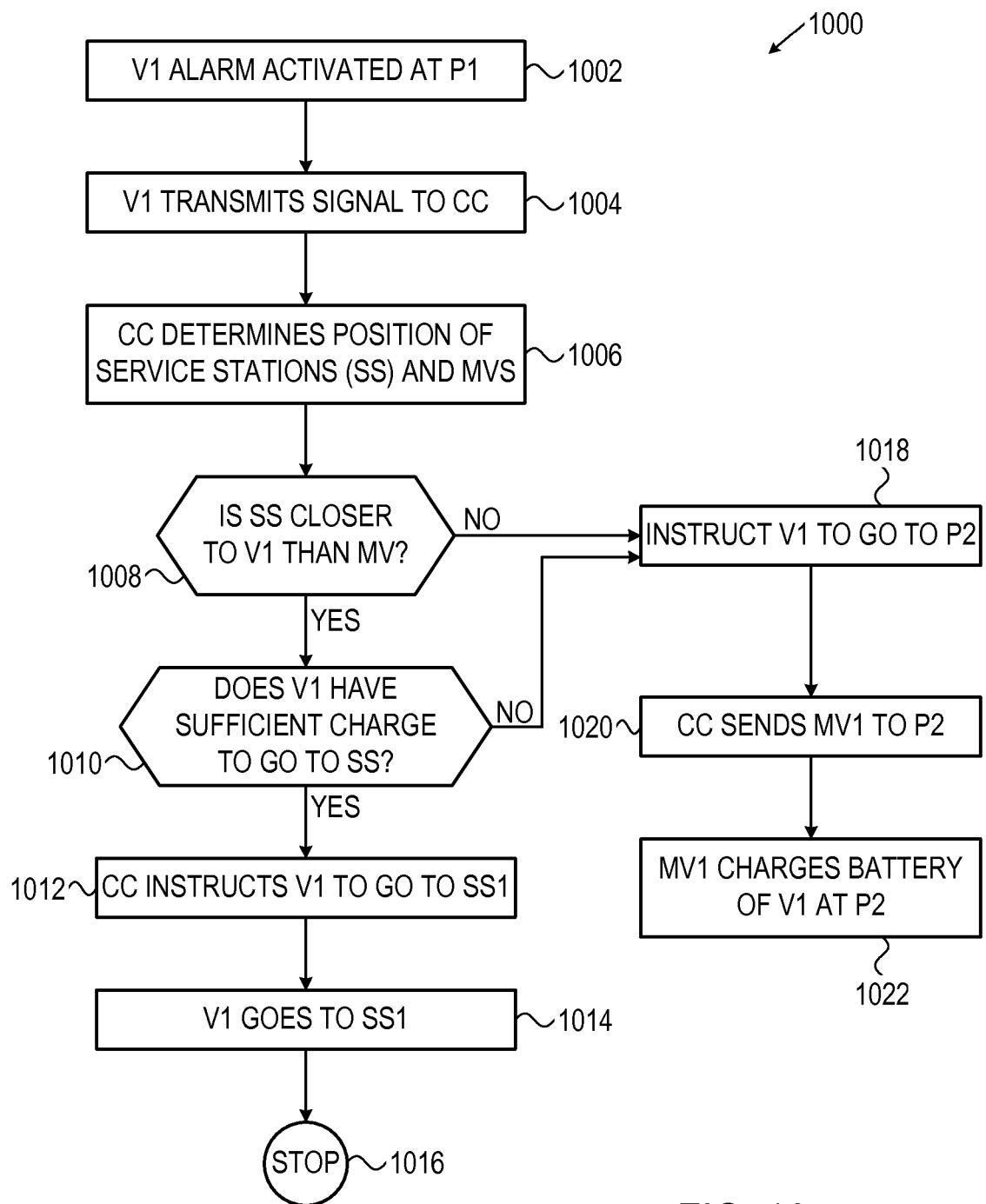
Figure 11:
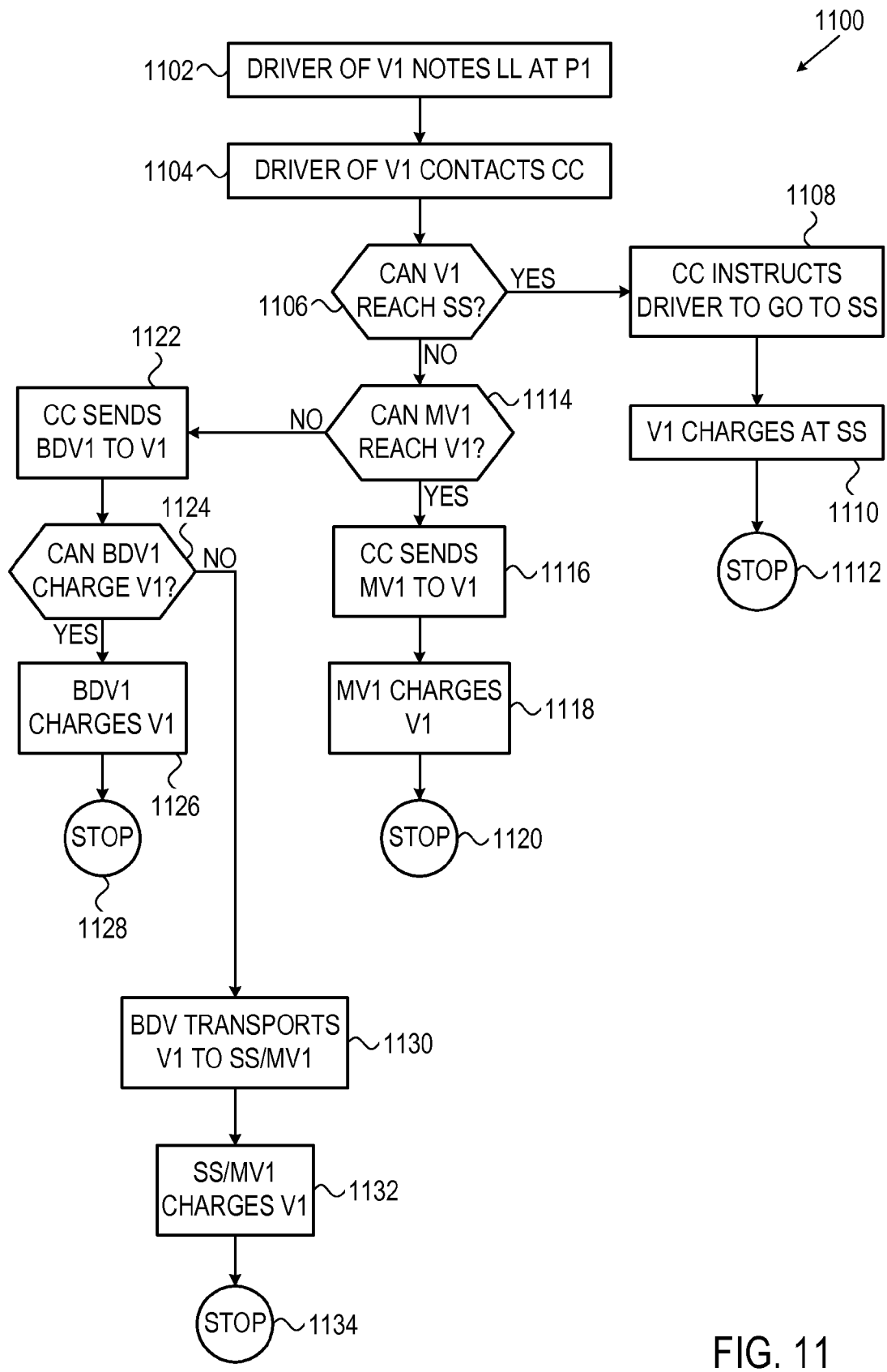
Figure 12:
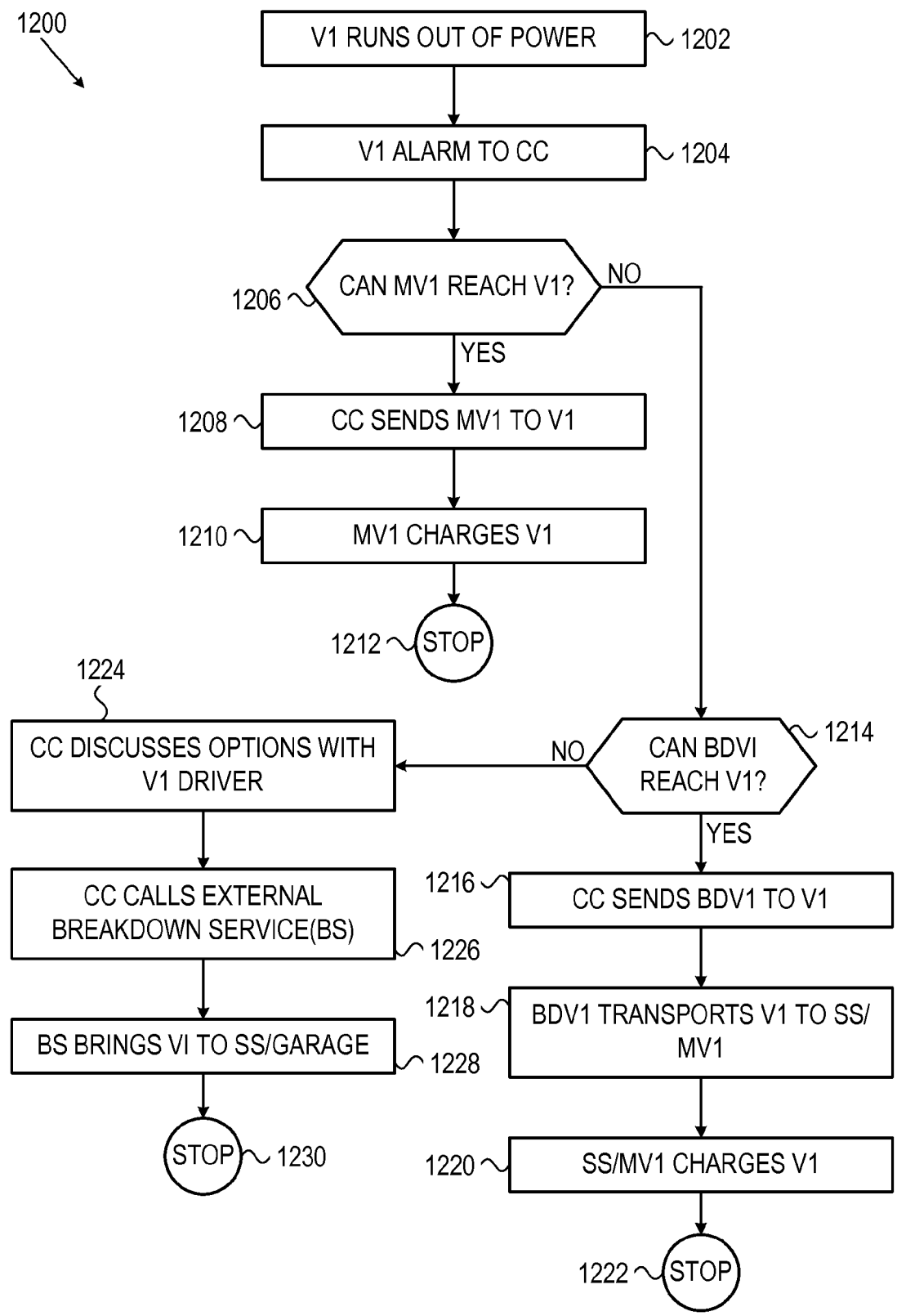

FIG. 3C relates to an illustrative, exemplary, non-limiting embodiment of a method for fast charging or discharging, in which the fast charging or discharging is directed by a central control;

FIG. 4 is a simplified block diagram showing further details of a control system of the system of FIG. 1, in accordance with some embodiments of the present invention;

FIG. 5A is a simplified flow chart of an automated method for tracking, locating and recharging an electric vehicle in transit by a master charging vehicle of FIG. 2A or 2B, in accordance with an embodiment of the present invention;

FIG. 5B is another simplified flow chart of a user-activated method for tracking, locating and recharging an electric vehicle in transit by a master charging vehicle of FIG. 2A or 2B, in accordance with an embodiment of the present invention;

FIG. 6 is another simplified flow chart of a method for tracking, locating and recharging an electric vehicle in transit by a master charging vehicle of FIG. 2A or 2B, in accordance with an embodiment of the present invention;

FIG. 7 is another simplified flow chart of a method for tracking, locating and recharging an electric vehicle in transit by a master charging vehicle of FIG. 2A or 2B, in accordance with an embodiment of the present invention;

FIG. 8 is a further simplified flow chart of a method for tracking, locating and recharging an electric vehicle in transit by a master charging vehicle of FIG. 2A or 2B, in accordance with an embodiment of the present invention;

FIG. 9 is an additional simplified flow chart of a method for tracking, locating and recharging an electric vehicle in transit by a breakdown vehicle, in accordance with an embodiment of the present invention;

FIG. 10 is a further simplified flow chart of a method for tracking, locating and recharging an electric vehicle in transit, in accordance with an embodiment of the present invention;

FIG. 11 is another simplified flow chart of a method for tracking, locating, recharging or transporting an electric vehicle in transit, in accordance with an embodiment of the present invention; and FIG. 12 is another simplified flow chart of a method for tracking, locating, recharging or transporting an electric vehicle in transit, in accordance with an embodiment of the present invention.

In all the figures similar reference numerals identify similar parts.

DETAILED DESCRIPTION OF PREFERRED EMBODIMENTS

According to at least some embodiments of the present invention, there is provided a system for mobile charging of electric vehicles "on the fly", without requiring the electric vehicle to enter a service station or to be towed (or otherwise passively moved) to such a service station.

According to at least some embodiments, the system comprises an electric vehicle comprising at least one battery of 1.5 to 200 kWh and a master charger vehicle. The master charger vehicle comprises:

i. a master battery module;
ii. an electricity converter module adapted to convert output power from said master battery module to input power suitable for provision to said at least one battery;
iii. a connection and transfer module adapted to transfer said input power from said electricity converter module to said at least one battery; and
iv. independent locomotive means for independent motion of said master charger vehicle; and
c) a control system in communication with said at least one electric vehicle and said master charger vehicle to enable said master charger vehicle to reach said electric vehicle, wherein said master battery module is adapted to charge said at least one battery with said at least one battery disposed in said electric vehicle.

Optionally (but without wishing to be limited in any way), the master charger vehicle comprises a standard "off the shelf" vehicle, which is then retrofitted with a charger module. As a non-limiting example of the present invention, this embodiment has many advantages, such as for example being able to adapt any vehicle that is already suitable for traveling to the location of the electric vehicle to also be able to charge such an electric vehicle. The charger module optionally comprises a master battery module, an electricity converter module adapted to convert output power from said master battery module to input power suitable for provision to said at least one battery, and a connection and transfer module adapted to transfer said input power from the electricity converter module to at least one battery. The separate charging module is suitable for retrofitting the standard vehicle.

According to at least some embodiments, there is provided a charging module, suitable for transport to a remote site in need of electrical power and suitable for retrofitting a standard vehicle, the charging module comprising a master battery module; an electricity converter module adapted to convert output power from said master battery module to input power suitable for providing 1 phase or three phase electricity; and a connection and transfer module adapted to connect to said charger connector and to transfer said input power from said electricity converter module to said remote site.

According to some other embodiments, there is provided a computer network system for providing electrical power to a remote site, the computer system comprising: the charging module as described herein; a transport vehicle for transporting the charging module to the remote site; a control center comprising: a computer system, at least one communication line for connecting the computer system to the transport vehicle, said at least one communication line comprising a publicly accessible communication network; wherein the remote site comprises a communication device for communicating with the control center through said publicly accessible communication network and locator means for providing a location of the remote site to the control center, such that the control center communicates the location of the remote site and the need for power of the remote site to the transport vehicle, such that the transport vehicle transports the charging module to the remote site to provide electrical power.

In the detailed description, numerous specific details are set forth in order to provide a thorough understanding of the invention. However, it will be understood by those skilled in the art that these are specific embodiments and that the present invention may be practiced also in different ways that embody the characterizing features of the invention as described and claimed herein.

In the following detailed description, numerous specific details are set forth in order to provide a thorough understanding of some embodiments of the invention. However, it will be understood by persons of ordinary skill in the art that some embodiments may be practiced without these specific details. In other instances, well-known methods, procedures, components, units and/or circuits have not been described in detail so as not to obscure the discussion.

The terms "plurality" or "a plurality" as used herein include, for example, "multiple" or "two or more". For example, "a plurality of items" includes two or more items.

Although portions of the discussion herein relate, for demonstrative purposes, to wired links and/or wired communications, some embodiments are not limited in this regard, and may include one or more wired or wireless links, may utilize one or more components of wireless communication, may utilize one or more methods or protocols of wireless communication, or the like. Some embodiments may utilize wired communication and/or wireless communication.

The terms "program", "computer program" or "code" as used herein include, for example, a source code, a computer program, a code or program written in a high-level programming language, a code or program written in a very high-level programming language, a code or program written in a low-level programming language, an assembly code or program, a machine language code or program, a single-thread program, a multiple-thread program, a portion of a code or program, a segment of a code or program, one or more instructions or sets of instructions, one or more subroutines, one or more procedures, one or more functions, one or more libraries, a logic, an object-oriented code or program, a portable or non-portable code or program, a code or program that requires compilation by a compiler, an originally-written code or program, a non-optimized code or program, an optimized code or program, a non-modified program, a modified program, a debugged program, a non-debugged program, a pre-compilation program version, a post-compilation program version, a pre-optimization program version, a post-optimization program version, a pre-linking program version, a post-linking program version, a program that was modified manually by a programmer, a program that was modified automatically by a compiler and/or linker and/or debugger and/or optimizer, a program that was subject to one or more iterations of optimization, a program that was subject to one or more methods of optimization, or the like.

The term "process" or "method" as used herein includes, for example, a portion or an instance of a computer program that is being executed by a computing system, e.g., by a computing system able to concurrently execute multiple processes.

Although portions of the discussion herein may relate, for demonstrative purposes, to a first process and a second process that attempt to access a shared resource, some embodiments may be used in conjunction with other combinations of processes and/or threads, for example: more than two processes; a first process of a first program, and a second process of the first program; a first process of a first program, and a second process of a second program; two or more threads; one or more threads, and one or more processes; threads of different processes; threads of different programs; processes of different programs; or other suitable combinations.

The term "resource" as used herein includes, for example, a physical and/or virtual component of a computing system; a variable; a database; a table; a record; a data item; a list; a field; an object; a memory cell; a memory area; a memory block; a disk or a portion thereof; a storage unit or a portion thereof; a file; a folder; a directory; a network connection; or the like.

The terms "shared resource" or "common resource" as used herein include, for example, a resource which may be accessed by two or more processes, threads, programs, routines, subroutines, functions, or other suitable software components and/or hardware components.

Reference is now made to FIG. 1, which is a simplified pictorial illustration showing a system 100 for tracking, locating and recharging electric vehicles, in accordance with some demonstrative embodiments of the invention. System 100 may be or may include, for example, a computing environment, a computing device, a computer, a Personal Computer (PC), a server computer, a client/server system, a mobile computer, a portable computer, a laptop computer, a notebook computer, a tablet computer, a network of multiple inter-connected computers or servers or devices, or the like.

System 100 includes a control center 110, comprising at least one computer system 119 for example, housing a processor 111, an input unit 112, an output unit 113, a memory and storage unit 114, a display 115 and a communication unit 116. System 100 may optionally include other suitable hardware components and/or software components.

Processor 111 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 111 executes instructions, for example, of an Operating System (OS) 117 (not shown) of system 100 and of one or more software applications (not shown) 118.

Input unit 112 includes, for example, a keyboard, a keypad, a mouse, a touch-pad, a track-ball, a stylus, a microphone, or other suitable pointing device or input device. Output unit 113 includes, for example, a monitor, a screen, a Cathode Ray Tube (CRT) display unit, a Liquid Crystal Display (LCD) display unit, a plasma display unit, one or more audio speakers or earphones, or other suitable output devices.

Memory unit 114 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units.

Storage unit 115 includes, for example, a hard disk drive, a floppy disk drive, a Compact Disk (CD) drive, a CD-ROM drive, a Digital Versatile Disk (DVD) drive, or other suitable removable or non-removable storage units. Memory unit 114 and/or storage unit 115, for example, store data processed by system 100.

Communication unit 116 includes, for example, a wired or wireless Network Interface Card (NIC), a wired or wireless modem, a wired or wireless receiver and/or transmitter, a wired or wireless transmitter-receiver and/or transceiver, a Radio Frequency (RF) communication unit or transceiver, or other units able to transmit and/or receive signals, blocks, frames, transmission streams, packets, messages and/or data. Optionally, communication unit 116 includes, or is associated with, one or more antennas, for example, a dipole antenna, a monopole antenna, an omni-directional antenna, an end fed antenna, a circularly polarized antenna, a microstrip antenna, a diversity antenna, or the like.

In some embodiments, some or all of the components of system 119 may be enclosed in a common housing or packaging, and may be interconnected or coupled or operably associated using one or more wired or wireless links. In other embodiments, components of system 100 may be distributed among multiple or separate devices or locations, may be implemented using a client/server configuration, may communicate using remote access methods, or the like.

Control center 110 is in at least one of direct and indirect communication with a public network 170, such as the internet, as well as at least one of direct and indirect communication with a positioning/location system network 160, such as a global positioning system or the like, which may include any type of wired or wireless communication network capable of coupling together computing nodes. This includes, but is not limited to, a local area network, a wide area network, or a combination of networks. In some embodiments, the communications network 170 is a wireless data network including: a cellular network, a WiMAX network, an EV-DO network, an RTT network, a Flash-OFDM network, an iBurst network, a HSPA network, an EDGE network, a GPRS network, a Wi-Fi network, a UTMS network, and/or any combination of the aforesaid networks.

Control center 110 is in at least one of direct and indirect communication with at least one electric vehicle 120. The electric vehicle is selected from the group consisting of an electric land vehicle, and electric water vehicle and an electric air vehicle, which can fly.

The term "electric land vehicle" is meant herein to broadly include any vehicle which travels on land. Some non-limiting examples of electric land vehicles include an electric bicycle, an electric motorbike, an electric trolley, an electric car, an electric truck, an electric tram; an electric train, an electric emergency vehicle and an electric army vehicle.

The term "electric water vehicle" is meant herein to broadly include any vehicle which travels on/in water. Some non-limiting examples of electric water vehicles include an electric bike, an electric boat, an electric yacht, an electric ship, an electric hovercraft, an electric hydrofoil, an electric submarine, an electric emergency water vehicle and an electric army water vehicle.

The term "electric air vehicle" is meant herein to broadly include any vehicle which travels in the air, typically by flight. Some non-limiting examples of electric air vehicles include an electric glider, an electric airplane, an electric helicopter, an electric airship, an electric spaceship or shuttle, an electric rocket, an electric emergency air vehicle and an electric army air vehicle.

It should be understood that system 100 is adapted for travel in any form in any medium, and should not be construed as limited to the specific embodiments shown in the Figures.

Control center 110 is further in communication with at least one master charger vehicle 150. Two different non-limiting embodiments of master charger vehicles 150 are shown in FIGS. 2A and 2B hereinbelow, for land and water travel respectively. In general terms, each master charger vehicle 150 is equipped with at least some of the following:
 a) a master battery module 152;
 b) a power converter 154;
 c) a power connection and transfer module 155;
 d) a vehicle positioning system 124;
 e) a master battery module management system 156;
 f) a mobile device 122; and
 g) a communication display 158.

Master charger vehicle 150 is also equipped with independent locomotive means for independent motion of master charger vehicle 150 (not shown, see FIGS. 2A and 2B below). Such independent locomotive means may optionally comprise one or more engines for example. For land travel for example, such engine(s) would optionally and preferably be connected to, and would power the movement of, one or more wheels, treads or other suitable devices for contacting the ground and for enabling locomotive movement of master charger vehicle 150. For water travel, a propeller or other suitable water travel device would optionally and preferably be connected to the one or more engines.

In some cases, the master charger vehicle 150 is equipped with all of the above. Most master charger vehicles 150 have associated therewith at least one person, who is a service provider 104, trained to provide electrical vehicles with at least some the services described herein. Some of the methods of servicing electric vehicle 120 are described in further detail with respect to FIGS. 4-12 hereinbelow. Each service provider may have at least one additional mobile device 170 for communications with the control center and/or a user 102 of electric vehicle 120.

Electric vehicle 120 comprises at least some of the following:
 a) a battery management system 121;
 b) a mobile positioning device 122;
 c) a battery alarm system 123;
 d) a vehicle positioning system 124;
 e) a motor 126;
 f) a display 127;
 g) an electric battery pack 128, wherein movement of the electric vehicle is powered exclusively by the electric battery pack 128; and
 h) a charger connector 129, which optionally and preferably comprises a fast charging socket 133.

According to some embodiments, vehicle 120 comprises all of the above.

Electric vehicle 120 comprises at least one battery pack 128. The size of the battery pack depends on the weight of the vehicle, motor size etc.

Some examples of typical battery pack sizes appear in Table 1 hereinbelow.

TABLE 1

Typical Battery sizes for different sizes of electric vehicle

| Vehicle type | Vehicle weight (ton) | Motor size [HP] | Battery size range [kWh] | Distance range before charging [km] |
|---|---|---|---|---|
| Motorbike | 0.15-0.30 | 10-100 | 1.5-7 | 50-100 |
| e.g. Electric Motorsport GPR-s | 0.18 | 19 | 3.3 | 70 |
| Small car | 0.80-1.50 | 35-100 | 7-25 | 50-150 |
| e.g. Mitsubishi i-MiEV | 1.10 | 64 | 16 | 110 |
| Estate car | 1.50-2.80 | 75-350 | 14-50 | 80-300 |
| e.g. BYD e6 | 2.02 | 100-272 | 16-48 | 90-300 |
| 4 × 4 jeep | 2.0-4.0 | 120-400 | 16-60 | 80-350 |
| 4 × 4 e-Jeep | | | | |
| 15 seater minibus e.g. Smith Electric Vehicles Edison LWB | 3.5-5.0 4.3 | 100-300 122 | 20-70 50 | 80-300 200 |
| 60 seater bus | 18-30 | 250-600 | 30-150 | 70-300 |
| Truck | 8-30 | 120-500 | 50-200 | 90-350 |
| e.g. Smith Electric Vehicles Newton 12 t | 12 | 163 | 80 | 160 |

Control center 110 is further in communication with at least one breakdown vehicle 130. It should be understood that though one non-limiting embodiments of the breakdown vehicle is shown in FIG. 1, for land travel, the same functions can be provided for water and air. In general terms, each breakdown vehicle 130 is equipped with at least some of the following:
 a) a master battery module 132;
 b) a power converter 134;
 c) a power connection and transfer module 135;
 d) a vehicle positioning system 124;
 e) a master battery module management system 136;
 f) a mobile positioning device 122; and
 g) a communication display 138.

In some cases, the breakdown vehicle is equipped with all of the above. Most breakdown vehicles have associated therewith at least one person, who is a service provider 104, trained to provide electrical vehicles with at least some of the services described herein. Some of the methods of servicing electric vehicle 120 are described in further detail with respect to FIGS. 4-12 hereinbelow.

Breakdown vehicle 130 is further constructed and configured to perform at least one of the following:
  a) tow at least one electric vehicle 120 using a tow line and connection module 139 (also see tow line and connection module 239 in FIG. 2B);
  b) carry and transport at least one electric vehicle 120. This typically involves a ramp 137 or lifting system and a clamp system 138 for clamping the electric vehicle whilst on board the breakdown vehicle;
  c) test the battery pack of the electric vehicle and/or other elements thereof whilst on board the breakdown vehicle; and
  d) charge the battery pack of the electric vehicle whilst on board the breakdown vehicle via power connection and transfer module 135 from master battery module 132.

In some embodiments, breakdown vehicle 130 is constructed and configured to perform three of the four above functions.

In some embodiments, breakdown vehicle 130 is constructed and configured to perform all of the four above functions.

Control center 110 is in at least one of direct and indirect communication with stationary service station 140.

System 100 further comprises a positioning network system 160 adapted to provide real-time positions of at least one of:
  a) at least one electric vehicle 120;
  b) at least one mobile device 170 associated with user 102;
  c) at least one mobile device 170 associated with service provider 104;
  d) at least one master charger vehicle 150;
  e) at least one stationary service station 140; and
  f) at least one breakdown vehicle 130.

Positioning network system 160 is further constructed and configured to provide the control center with real-time positions, typically superimposed on a map, of at least one of:
  a) the at least one electric vehicle 120;
  b) the at least one mobile device 170 associated with user 102;
  c) the at least one mobile device 170 associated with service provider 104;
  d) the at least one master charger vehicle 150;
  e) the at least one stationary service station 140; and
  f) the at least one breakdown vehicle 130.

Control center 110 is in at least one of direct and indirect communication with positioning network system 160.

Positioning network system 160 may comprise, for example, a network of satellites in a global satellite navigation system (e.g., GPS, GLONASS, Galileo, etc.), a network of beacons in a local positioning system (e.g., using ultrasonic positioning, laser positioning, etc.), a network of radio towers, a network of Wi-Fi base stations, and any combination of the aforementioned positioning networks. Furthermore, the positioning system 160 may include a navigation system that generates routes and/or guidance (e.g., turn-by-turn or point-by-point, etc.) between a current geographic location of the electric vehicle and a destination, as was described in US Patent Application Publication No. 20100094496, incorporated herein by reference.

Control center 110 is in at least one of direct and indirect communication with a payment system center 180. Payment center may comprise at least one computer system 119 as shown and described with respect to the control center. The payment system center is constructed and configured to charge users of an electric vehicle 120 for at least one of:
  a) charging an on-board battery pack 128 by a master charger vehicle 150;
  b) charging on-board battery pack 128 by a breakdown vehicle 130;
  c) charging on-board battery pack 128 at a stationary service station 140;
  d) testing an on-board battery pack 128 by master charger vehicle 150;
  e) testing an on-board battery pack 128 by master charger vehicle 150;
  f) testing an on-board battery pack 128 by breakdown vehicle 130;
  g) providing other services by breakdown vehicle 130;
  h) providing other services at stationary service station 140; and
  i) providing other services by a master charger vehicle 150.

Some typical charging time ranges from the master charger vehicle to the electric vehicles are provided in Table 2.

TABLE 2

Typical Battery Charging times for different sizes of electric vehicle

| Vehicle type | Battery size range [kWh] | Time range required to charge battery from master charger vehicle min | C rate | Time range required to charge battery from breakdown vehicle min | C rate |
| --- | --- | --- | --- | --- | --- |
| Motorbike | 1.5-7 | 10-720 | 0.20-3 | 10-720 | 0.20-3.0 |
| Small car | 7-25 | 10-720 | 0.20-3 | 10-720 | 0.20-3.0 |
| Estate car | 14-50 | 20-720 | 0.20-3 | 20-720 | 0.20-3.0 |
| 4 × 4 jeep | 16-60 | 20-720 | 0.20-3 | 20-720 | 0.20-3.0 |
| 15 seater minibus | 20-70 | 25-720 | 0.20-3 | 25-720 | 0.20-3.0 |
| 60 seater bus | 30-150 | 40-720 | 0.20-3 | 40-720 | 0.20-3.0 |

According to at least some embodiments of the present invention, the connection and transfer module 155 of the master charger vehicle 150 further comprises a fast charging transfer device (not shown, see FIGS. 2A and 2B). As previously described, the charger connector 129 of the electric vehicle 120 further comprises a fast charging socket 133, such that the connection and transfer module is adapted to transfer said input power from the electricity converter module of the master charger vehicle 150 to at least one battery 128 of the electric vehicle 120 through fast charging.

Optionally 70-100% of said battery 128, disposed inside said electric vehicle 120, is charged by said master charger vehicle 150 within one hour. Also optionally and preferably 70-100% of said battery 128, disposed inside said electric vehicle 120, is charged by said master charger vehicle 150 within 20 minutes, more preferably within 10 minutes and most preferably within 5 minutes, through said fast charging transfer device to the fast charging socket 133 and hence to at least one battery 128.

Master charger vehicle 150 may optionally be any type of vehicle and may optionally comprise a standard vehicle which is then retro-fitted with a charger module. The charger module optionally comprises master battery module 152, electricity converter module 154 adapted to convert output power from said master battery module to input power suitable for provision to said at least one battery, and a connection and transfer module 155 adapted to transfer said input power from the electricity converter module to at least one battery. The separate charging module is suitable for retrofitting the standard vehicle and is preferably independent of the vehicle manufacturer or vehicle model.

Reference is now made to FIG. 2A, which is a simplified pictorial illustration showing master charging land vehicle (MV1) 150, in accordance with an embodiment of the present invention. Some of the elements of MV1 were described hereinabove. MV1 150 also preferably comprises independent locomotive means as previously described (in this non-limiting example, the locomotive means comprise an engine 161 and a plurality of tires 163). Additionally, MV1 may comprise a bulletproof layer 153 which may additionally or alternatively be a fireproof layer.

Master charging land vehicle (MV1) is adapted to charge battery packs of electric vehicles that run out or have short supply of power, when they are in positions where they cannot reach a stationary service station with the remaining amount of power in their battery pack. Some non-limiting examples of the methods of servicing the electric vehicles are described herein with respect to FIGS. 4-12 hereinbelow.

Master charging land vehicle (MV1) 150 comprises master charge battery module 152. MV1 is constructed and configured to charge a plurality of electric vehicles EVs en route to their destination.

Typical values of the numbers of EVs that an MV can charge are provided in Table 3 hereinbelow.

TABLE 3

Examples of Master Vehicle charging capacity.

| Master Vehicle type | Master Battery size range [KWh] | No of 1-2 ton EVs To be charged by MV | No of 2-5 ton EVs to be charged by MV | Time range required to charge battery from breakdown vehicle |
|---|---|---|---|---|
| Van | 7-210 | 3-70 | 2-50 | 10-720 |
| Truck | 50-3000 | 16-1000 | 10-600 | 10-720 |
| Semi-trailer | Up to 1000 | Up to 350 | Up to 200 | 10-720 |

As previously described with regard to FIG. 1, the connection and transfer module 155 of MV1 150 preferably further comprises a fast charging transfer device 167 for rapid or fast charging of the at least one battery of the vehicle. Fast charging transfer device 167 may also optionally be used for fast discharging, in case of an accident for example, as described in the exemplary illustrative method with regard to FIG. 3B. With regard to fast discharging, optionally 70-100% of said battery 128, disposed inside said electric vehicle 120, is discharged to said master charger vehicle 150 within one hour. Also optionally and preferably 70-100% of said battery 128, disposed inside said electric vehicle 120, is discharged to said master charger vehicle 150 within 20 minutes, more preferably within 10 minutes and most preferably within 5 minutes, from at least one battery 128 through fast charging socket 133 and hence to said fast charging transfer device 167 (not shown, see FIG. 1).

Reference is now made to FIG. 2B, which is a simplified pictorial illustration showing a master charging water vehicle (MW1) 200 for travel in/on water 201, in accordance with an embodiment of the present invention.

MW1 200 also preferably comprises independent locomotive means as previously described (in this non-limiting example, the locomotive means comprise an engine 261 and a propeller (not shown)). In general, each master charging water vehicle (MW1) 200 is equipped with at least some of the following:
  a) a master battery module 152;
  b) a power converter 154;
  c) a power connection and transfer module 155;
  d) a vehicle positioning system 124;
  e) a master battery module management system 156;
  f) a mobile device 122;
  g) an electric motor 206; and
  h) a communication display 158.

In some cases, the MW1 is equipped with all of the above. Most MW1s have associated therewith at least one person, who is a service provider 104, trained to provide electrical vehicles with at least some the services described herein. Some of the methods of servicing electric vehicle 120 are described in further detail with respect to FIGS. 4-12 hereinbelow. Each service provider may have at least one additional mobile device 170 for communications with the control center and/or a user 102 of electric vehicle 120.

As previously described with regard to FIG. 1, the connection and transfer module 155 of MW1 150 preferably further comprises a fast charging transfer device 267, which may again optionally be used for fast discharging as described with regard to the exemplary method of FIG. 3B.

MW1 200 is further constructed and configured to perform at least one of the following:
  a) tow at least one electric water vehicle 220 (not shown) using a tow line and connection module 239;
  b) carry and transport at least one electric water 220. This typically involves a ramp 237 (not shown) or lifting system and a clamp system 238 (not shown) for clamping the electric vehicle whilst on board the MW1;
  c) test the battery pack of the electric water vehicle 220 and/or other elements thereof whilst on board the MW1; and
  d) charge the battery pack of the electric water vehicle whilst on board the MW1 vehicle via power connection and transfer module 155 from master battery module 152.

Reference is now made to FIG. 3A, which is a simplified block diagram 300 showing further details of a master charging vehicle 150 FIG. 2A or 200 of FIG. 2B, or breakdown vehicle 130 of FIG. 1, in accordance with some embodiments of the present invention.

The master charging vehicle may comprise one or more or all of the following components:
  a) an air-water generator system 310;
  b) a wind turbine energy system 380;
  c) a solar energy system 390; and
  d) an energy transformer system 392.

An air-water generator system 310, may be a system such as that described in U.S. Pat. No. 7,722,706 or in US Patent Application Publication No. 2009151368A1, incorporated herein in its entirety by reference, or any other air-water generator system known in the art.

Wind turbine system 380 may be any suitable wind turbine system known in the art, such as that described in U.S. Pat. No. 7,709,972.

Solar energy system 390 may be any suitable solar panel system suitable for a vehicle, such as that described in US Patent Application Publication No. US2007261896 A1 or the system of U.S. Pat. No. 7,469,541.

Master battery module 152 may be charged from an electricity grid 395 via transformer system 392. Additionally or alternatively, module 152 may receive some or all of its power from solar system 390 and/or wind turbine system 380.

Master battery module 152 is controlled by a master battery management system 156 and sensors 306, in communication via a sensor module 304 with an integration and service coordination bus 302. Bus 302 is constructed and configured to receive inputs and outputs from a user interface 320, manned by service provider 104, a power control system 156, which manages power from the battery management system and a power provision system 360, as well as from the solar system 390 and wind energy system 380.

Master battery module 152 is connected to power connection and transfer module 155, which is in turn connected to fast charging transfer device 167 (not shown). Power control system 156 preferably controls whether fast charging or fast discharging occurs, and more preferably controls the rate of such charging or discharging, as described with regard to the exemplary method of FIG. 3B. Optionally, control center 110 may direct power control system 156, for example with regard to whether charging or discharging occurs, and/or with regard to the rate of such charging or discharging. Control center 110 may also optionally override any function of power control system 156, for example with regard to charging or discharging.

According to some embodiments, the master vehicle comprises all of the aforementioned systems. Depending on the systems on board master vehicle 150 or 200, the transformer system 392 will be built to enable power transfer from these systems to master battery module, as is known in the art.

An air conditioning system 370 may be selected from a standard vehicle air conditioning system as is known in the art, a solar air conditioning system as described in US2010031682A or WO08114266 and may be integrated with the air-water generator.

The air water generator may condense and/or extract water from air. The collected water is stored in a water tank 312, enabling the master vehicle to provide water to electric vehicles 120 (FIG. 1) as may be required, from a water provision service 314, as well as providing the water requirements of the master vehicle. Additionally, the water may be used in the air conditioning system 370.

Bus 302 also coordinates information from positioning system 124, a tow and load module 340 and a communication module 350.

Bus 302 communicates information regarding the services provided by the master vehicle to the electric vehicle to control center 110 (FIG. 1). For example, the services may include, but are not limited to, battery pack 128 charging, battery pack testing, water provision, towing services and other services.

Bus 302 also receives information from the control center via communication module 350 regarding electric vehicles requiring servicing. The information may include, user data, location, battery status, other service requirements, user payment status and the like.

FIG. 3B shows an exemplary, non-limiting, illustrative method for fast charging or discharging according to at least some embodiments of the present invention. The method relies upon the provision of an electric vehicle, comprising a battery, a power control system for the battery, a communication device in communication with the battery and a fast charging socket associated with the battery, which is preferably capable of both fast charging and fast discharging of the battery as described herein. The method also relies upon provision of a master charger vehicle, comprising a fast charging transfer device for connecting to the fast charging socket of the electric vehicle and which is preferably capable of both fast charging and fast discharging of the battery as described herein, a power control system for controlling charging and/or discharging and a communication device. The method also relies upon a communication center for relaying communication between the electric vehicle and the master charger vehicle, although optionally if such a communication center is not present, the electric vehicle and the master charger vehicle may optionally communicate directly. By "directly" it is also meant through a communication network, such as a cellular network or satellite network for example. The method is optionally performed, for example, with regard to the systems and vehicles shown in FIGS. 1-3.

In stage 1, an electric vehicle is determined to be in need of fast charging or discharging, for example, according to internal monitoring of its battery by the power control system. As a non-limiting example, fast charging may optionally be determined when the battery level of the electric vehicle drops below a minimum threshold. The minimum threshold may optionally be determined with regard to the distance of the electric vehicle from the master charger vehicle or according to one or more other factors, such as a distance from city limits and so forth.

As another non-limiting example, fast discharging may optionally be determined in case of excessive physical stress to one or more parts of the electric vehicle, for example in case of an accident. Optionally, such excessive physical stress is determined with regard to a specific part of the electric vehicle, such as for example the battery and/or the compartment or structure surrounding and/or supporting the battery. Fast discharging may also optionally be determined due to a mechanical and/or electrical fault of the electric vehicle. Fast discharging is preferably determined for any situation in which leaving the battery of the electric vehicle in at least a partially charged state potentially a safety hazard.

In stage 2, once fast charging or fast discharging has been determined, the electric vehicle initiates communication with the master charger vehicle, optionally through the communication center. Preferably communication features a handshake process between the electric vehicle and the communication center, and also between the master charger vehicle and the communication center. More preferably the handshake process includes at least one security process for providing a secure communication channel. Optionally the handshake process occurs directly between the electric vehicle and the master charger vehicle, without the communication center.

In stage 3, the electric vehicle indicates a need for a fast charge or discharge of its battery, and optionally an urgency of the request. The urgency of the request may optionally be determined by the power control system. For example, in case of an imminent energy failure of the battery and/or a safety risk posed by the battery (for fast discharging), the request may optionally be marked as urgent. The request also preferably includes a location of the electric vehicle (which may optionally be determined by GPS for example, and/or triangulation within a communication network such as a cellular network for example).

In stage 4, optionally the communication center prioritizes the request of the electric vehicle according to the urgency of the request and also optionally the location of the electric vehicle relative to the master charger vehicle. Also optionally, the communication center may determine which master charger vehicle is to respond to the request, in which case the initiation of communication between the electric vehicle and the master charger vehicle is not performed until after this stage.

In stage 5, the master charger vehicle receives the request of the electric vehicle, whether directly or through the communication center, and moves toward the electric vehicle.

In stage 6, the master charger vehicle and the electric vehicle meet at the same location and initiate charging or discharging. Preferably, both vehicles are stationary at this time.

For charging, optionally 70-100% of the battery inside the electric vehicle is charged by the master charger vehicle within one hour. Also optionally and preferably 70-100% of the battery inside the electric vehicle is charged by the master charger vehicle within 20 minutes, more preferably within 10 minutes and most preferably within 5 minutes.

For discharging, optionally 70-100% of the battery inside the electric vehicle is discharged to the master charger vehicle within one hour. Also optionally and preferably 70-100% of the battery inside the electric vehicle is discharged to the master charger vehicle within 20 minutes, more preferably within 10 minutes and most preferably within 5 minutes.

FIG. 3C relates to an illustrative, exemplary, non-limiting embodiment of a method for fast charging or discharging, in which the fast charging or discharging is directed by a central control. The method in this embodiment relies upon the provision of a central control for communicating with the master charger vehicle and the electric vehicle, in addition to the components of the method of FIG. 3B. For the purpose of description only, the communication center is assumed to be part of the central control but it may also optionally be separate from the central control.

In stage 1, an electric vehicle is determined to be in need of fast charging or discharging by the central control, which also preferably determines the urgency of such a need as previously described. The central control also preferably prioritizes between a plurality of such needs for electric vehicles as previously described.

The central control preferably receives periodic information about the state of the battery and of the electric vehicle, for example, according to internal monitoring of its battery by the power control system. The power control system preferably provides this information to the central control through the communication device of the electric vehicle. Communication between the central control and the electric vehicle is preferably established according to a handshake protocol with the communication center as previously described, which in turn communicates with the central control.

The central control also optionally collects such monitoring data and stores such data, optionally for further analysis (for example to determine master charger vehicle deployment, energy efficiency of the electric vehicles and so forth).

In stage 2, once fast charging or fast discharging has been determined, the central control selects a master charger vehicle to respond to the need of the electric car and initiates communication with the master charger vehicle, optionally through the communication center as previously described.

In stage 3, the master charger vehicle receives the request of the central control, whether directly or through the communication center, and moves toward the electric vehicle.

In stage 4, the master charger vehicle and the electric vehicle meet at the same location and initiate charging or discharging as previously described.

Reference is now made to FIG. 4, which is a simplified block diagram showing further details of a control system 400 of the system of FIG. 1, in accordance with some embodiments of the present invention.

Control system 400 is typically located at control center 110 and comprises at least one computer system 119 as described hereinabove with reference to FIG. 1.

Memory and storage unit 114 may comprise a number of memory modules, each storing data relevant to a certain part of system 100. These modules are updated with data in real-time, with respect to changes within the system. These modules may include, but are not limited to:

a) a real-time positioning module 402;
b) a breakdown vehicle module 404;
c) a land master charger vehicle module 406;
d) a (land) electric vehicle module 408;
e) a (water) electric vehicle module 410;
f) a stationary service station module 412;
g) an energy provision module 414;
h) a water provision module 416;
i) an other services provision module 418;
j) a payment module 420;
k) a user account module 422;
l) a user interface module 424; and
m) a water and master charger vehicle module 426 (not shown).

As is known in the art, information and data may be input by a user at the control center using the input unit and/or may be received from remote locations, such as from the electric vehicle of FIG. 1, from the master vehicle 150, 200 or breakdown vehicle 130 or from control and/or communication systems thereof, such as those shown in FIG. 3A. The control center may optionally operate as described with regard to FIG. 3C.

Turning now to FIG. 5A, there is seen a simplified pictorial illustration showing a flowchart 500 n automated method for tracking, locating and recharging an electric vehicle in transit, in accordance with an embodiment of the present invention and with reference to the figures.

User 102 is driving his vehicle 120, V1 when the power level in battery pack 128 reaches a certain low level thereby activating alarm 123, when the vehicle is at a position P1, in an alarm activating step 502.

Alarm 123 transmits a signal to control center 110 in an alarm transmission step 504. The alarm transmission may automatically activate positioning system 124 of V1 to determine the current position of V1 and relay it to the control center. The position data received by the control center may be stored in real-time positioning module 402 and the alarm data in the electric vehicle module 408, for example.

In a user contacting step 506, the control center (CC) may contact user 102 by means of his mobile device to determine the planned route of user 102.

In a master vehicle sending step 508, the control center sends master vehicle 150 to a second position P2 along the route of the user and within easy reach of P1.

After both the master vehicle and V1 are at the second position P2, the master vehicle 150 charges the battery pack 128 of vehicle 120 at position 2 in a charging step 510. User 102 can thus continue along his route to his destination.

As previously described, a similar method may optionally be performed for discharging the battery pack 128.

Details of the amount of power provided, distance traveled by the master vehicle and data pertaining to the time of day and week are relayed to the control center. The data may be stored in the energy provision module 414 and user account module 422, for example. Additionally, some data relating to the services provided by MV1 are stored in land master charger vehicle module 406, as these may be reflected in remuneration of service provider 104.

Reference is now made to FIG. 5B, which is a simplified flow chart 550 of a user-activated method for tracking, locating and recharging an electric vehicle in transit by a master charging vehicle of FIG. 2A or 2B, in accordance with an embodiment of the present invention.

Driver (user 102) of vehicle V1, 120 notices that the battery power has reached a low level (LL), in a noting step 552 at a first position, P1. In some cases, this may be by a reading viewed on the car dashboard display 127, for example.

The driver contacts control center by means of an on board mobile device 122 or by his own private mobile device 170 in a contacting step 554.

The control center checks the position of V1 by at least one of:
a) the real-time position of mobile device 122;
b) the real-time position of positioning system 124;
c) the real-time position of mobile device 170;
d) data reported verbally by user 102.

The control center checks the position of MV1 by at least one of:
a) the real-time position of mobile device 122;
b) the real-time position of positioning system 124;
c) the real-time position of mobile device 170;
d) data reported verbally by user 104.

The CC thus determines the relative positions of V1 and at least one MV in checking step 556.

The CC may instruct user 102 to continue along a certain route to a second position P2 in a route defining step 558.

In an MV sending step 560, the CC sends the MV closest to V1 to P2. After both the master vehicle and V1 are at the second position P2, the master vehicle 150 charges the battery pack 128 of vehicle 120 at position 2 in a charging step 562. User 102 can thus continue along his route to his destination.

Details of the amount of power provided, distance traveled by the master vehicle and data pertaining to the time of day and week are relayed to the control center. The data may be stored in the energy provision module 414 and user account module 422, for example.

Additionally, some data relating to the services provided by MV1 are stored in land master charger vehicle module 406, as these may be reflected in remuneration of service provider 104.

In some cases, the communications will not only be between the control center 110 and user 102, but also between service provider 104 of MV1 and user 102. This is exemplified in FIG. 6. FIG. 6 is another simplified flow chart 600 of a method for tracking, locating and recharging an electric vehicle in transit by a master charging vehicle of FIG. 2A or 2B, in accordance with an embodiment of the present invention.

User 102 is driving his vehicle 120, V1 when the power level in battery pack 128 reaches a certain low level (LL1) thereby activating alarm 123, when the vehicle is at a position P1, in an alarm activating step 602.

Alarm 123 transmits a signal to control center 110 in an alarm transmission step 604.

The control center 110 determines the position of V1 from the positioning system 124 of V1, for example to determine the current position of V1 in a determining step 606. However, vehicle V1 is still in transit and has now traveled a distance D1 from P1 in traveling step 608. The position data received by the control center may be stored in real-time positioning module 402 and the alarm data in the electric vehicle module 408, for example.

In a master vehicle contacting step 610, the control center (CC) contact service provider 104 by means of his mobile device to relay details of the position of V1.

In a master vehicle traveling step 612, MV1 goes to the current position of V1 or to a second position P2.

In an instructing step 614, MV1 contacts user 102 and instructs him/her to go to a second position P2. Thereafter V1 goes to P2 in a V1 traveling step 616.

After both the master vehicle and V1 are at the second position P2, the master vehicle 150 charges the battery pack 128 of vehicle 120 at position 2 in a charging step 618. User 102 can thus continue along his route to his destination.

Details of the amount of power provided, distance traveled by the master vehicle and data pertaining to the time of day and week are relayed to the control center. The data may be stored in the energy provision module 414 and user account module 422, for example. Additionally, some data relating to the services provided by MV1 are stored in land master charger vehicle module 406, as these may be reflected in remuneration of service provider 104.

Reference is now made to FIG. 7, which is another simplified flow chart 700 of a method for tracking, locating and recharging an electric vehicle in transit by a master charging vehicle of FIG. 2A or 2B, in accordance with an embodiment of the present invention.

User 102 is driving his vehicle 120, V1 when the power level in battery pack 128 reaches a very low level (VL1) thereby activating alarm 123, when the vehicle is at a position P1, in a red alarm activating step 702.

Alarm VLL 123 transmits a signal to control center 110 in an alarm transmission step 704.

The control center 110 determines the position of V1 from the positioning system 124 of V1, for example to determine the current position of V1 in a determining step 706. The position data of the current position, P2 of V1, received by the control center may be stored in real-time positioning module 402 and the alarm data in the electric vehicle module 408, for example.

The control center checks the position of a plurality of MV1s in an MV position checking step 708, by at least one of:
a) the real-time position of mobile device 122;
b) the real-time position of positioning system 124;
c) the real-time position of mobile device 170;
d) data reported verbally by user 104.

In a master vehicle (MV) availability checking step 710, the control center (CC) checks to see if an MV is available to reach the position of the electric vehicle V1 with the very low level alarm of step 702, within a predetermined period of time, such as ten minutes.

If yes, the control center instructs V1 to go to a near position, P3 and wait there in a V1 instruction step 712 and updates the nearest MV to go to P3.

In a master vehicle traveling step 714, MV1 goes to the third position, P3.

After both the master vehicle and V1 are at the third position P3, the master vehicle 150 charges the battery pack 128 of vehicle 120 at position 3 in a charging step 716. User 102 can thus continue along his route to his destination.

Details of the amount of power provided, distance traveled by the master vehicle and data pertaining to the time of day and week are relayed to the control center. The data may be stored in the energy provision module 414 and user account module 422, for example. Additionally, some data relating to the services provided by MV1 are stored in land master charger vehicle module 406, as these may be reflected in remuneration of service provider 104.

If at step 710, there is no MV in the vicinity of V1, the control center instructs V1 to stop at his current position, P2 in V1 instructing step 718.

V1 stops at position P2 in a stopping step 720.

In a second checking step 722, the control center (CC) checks to see if an MV is available to reach the position of the electric vehicle V1 with the very low level alarm of step 702, within a predetermined period of time, such as twenty minutes.

If yes, the control center instructs MV2 to go to P2 where V1 is waiting in an MV2 sending step 724.

After both the master vehicle MV2 and V1 are at the second position P2, the master vehicle MV2 150 charges the battery pack 128 of vehicle 120 at position 2 in a charging step 726. User 102 can thus continue along his route to his destination.

If at checking step 722, there is no MV available, the control center may perform an optional verification checking step 730 and then send a breakdown vehicle (BDV) 130 to P2 in a BDV sending step 728. The BDV can then either tow or transport V1 to a suitable location and/or can charge battery pack 128 in transit.

Reference is now made to FIG. 8, which is a further simplified flow chart 800 of a method for tracking, locating and recharging an electric vehicle in transit by a master charging vehicle of FIG. 2A or 2B, in accordance with an embodiment of the present invention.

User 102 is driving his vehicle 120, V1 when the power level in battery pack 128 reaches a certain low level LL1 thereby activating alarm 123, when the vehicle is at a position P1, in an alarm activating step 802.

Alarm 123 transmits a signal to control center 110 in an alarm transmission step 804. The alarm transmission may automatically activate positioning system 124 of V1 to determine the current position of V1 and relay it to the control center. The position data received by the control center may be stored in real-time positioning module 402 and the alarm data in the electric vehicle module 408, for example.

In a user contacting step 806, the control center (CC) may contact user 102 by means of his mobile device to determine the planned route of user 102.

In an electric vehicle traveling step 808, the control center sends master vehicle 150 to a second position P2 along the user's (102) planned route.

Shortly after reaching position, P2, the very low level (VLL) alarm is activated in a second alarm activating step 810.

V1 stops at P2 in a stopping step 814. Thereafter, in a master vehicle traveling step 814, control center sends MV1 to the current position of V1 at second position P2.

After both the master vehicle and V1 are at the second position P2, the master vehicle 150 charges the battery pack 128 of vehicle 120 at position 2 in a charging step 816.

User 102 can thus continue along his route to his destination.

Details of the amount of power provided, distance traveled by the master vehicle and data pertaining to the time of day and week are relayed to the control center. The data may be stored in the energy provision module 414 and user account module 422, for example. Additionally, some data relating to the services provided by MV1 are stored in land master charger vehicle module 406, as these may be reflected in remuneration of service provider 104.

As was shown in FIGS. 5A-8, there are many occasions, in which the MV will charge the battery pack of V1. In some cases, there are no MVs available in the area. FIG. 9 is an additional simplified flow chart 900 of a method for tracking, locating and recharging an electric vehicle in transit by a breakdown vehicle 130, in accordance with an embodiment of the present invention.

User 102 is driving his vehicle 120, V1 when the power level in battery pack 128 reaches a certain low level thereby activating alarm 123, when the vehicle is at a position P1, in an alarm activating step 902.

Alarm 123 transmits a signal to control center 110 in an alarm transmission step 904. The alarm transmission may automatically activate positioning system 124 of V1 to determine the current position of V1 and relay it to the control center. The position data received by the control center may be stored in real-time positioning module 402 and the alarm data in the electric vehicle module 408, for example.

In a master vehicle location checking step 906, the control center (CC) checks the position of MV1 by at least one of:
a) the real-time position of mobile device 122;
b) the real-time position of positioning system 124;
c) the real-time position of mobile device 170;
d) data reported verbally by user 104.

It is found that there are no MVs available in the region.

The control center then contacts user 102 by means of his mobile device, for example and instructs the user to wait or go to position P2 in a user instruction step 908.

In a breakdown vehicle sending and charging step 910, the control center sends breakdown vehicle 130 to the second position P2. After both the BDV and V1 are at the second position P2, the BDV vehicle 130 charges the battery pack 128 of vehicle 120 at position 2. User 102 can thus continue along his route to his destination.

Details of the amount of power provided, distance traveled by the master vehicle and data pertaining to the time of day and week are relayed to the control center. The data may be stored in the energy provision module 414 and user account module 422, for example. Additionally, some data relating to the services provided by BDV1 are stored in break down vehicle module 404, as these may be reflected in remuneration of service provider 104.

Turning to FIG. 10, there is seen a further simplified flow chart 1000 of a method for tracking, locating and recharging an electric vehicle in transit, in accordance with an embodiment of the present invention.

User 102 is driving his vehicle 120, V1 when the power level in battery pack 128 reaches a certain low level thereby activating alarm 123, when the vehicle is at a position P1, in an alarm activating step 1002.

Alarm 123 transmits a signal to control center 110 in an alarm transmission step 1004. The alarm transmission may automatically activate positioning system 124 of V1 to determine the current position of V1 and relay it to the control center. The position data received by the control center may be stored in real-time positioning module 402 and the alarm data in the electric vehicle module 408, for example.

In a service station 140 (SS) locating step 1006, the control center checks to see the nearest SSs and MVs in the vicinity of vehicle 120.

In a checking step 1008, the control center checks to see if P1 is closer to an SS than to an available MV.

If yes, then the control center checks in a second checking step 1010 if the EV 120 can reach the near SS with the remaining power in battery pack 128. For example, if the alarm was activated in step 1002 by means of a low level indicator (indicating that battery pack 128 has, for example 15% power left, suggesting that vehicle 128 can travel another 15 km and SS1 is within 3 km), then in this step the outcome will be yes. If SS is 15 km away, then the answer is no, because the LL indicator may not be 100% accurate).

If the outcome of checking step 1012 is yes, then in a user instructing step 1012, the control center (CC) contacts user 102 by means of his mobile device, for example to go to SS1.

In a vehicle traveling step 1014, V1 goes to the service station SS1 in his vicinity (and receives there all the required services-though not shown, V1 are at the second position P2, SS1 140 charges the battery pack 128 of vehicle 120 in a charging step 1016. User 102 can thus continue along his route to his destination.

Details of the amount of power provided, distance traveled by the master vehicle and data pertaining to the time of day and week are relayed to the control center. The data may be stored in the energy provision module 414 and user account module 422, for example. Additionally, some data relating to the services provided by SS1 are stored in service station module 412, as these may be reflected in remuneration of service station 140.

Turning back to step 1008, if MV1 is closer to V1 (no at step 1008), then in a user instructing step 1018, the control center (CC) may instructs user 102 by means of his mobile device and sends him to position 2 P2.

In a master vehicle sending step 1020, the control center sends master vehicle 150 to a second position P2.

After both the master vehicle and V1 are at the second position P2, the master vehicle 150 charges the battery pack 128 of vehicle 120 at position 2 in a charging step 1022. User 102 can thus continue along his route to his destination.

Details of the amount of power provided, distance traveled by the master vehicle and data pertaining to the time of day and week are relayed to the control center. The data may be stored in the energy provision module 414 and user account module 422, for example. Additionally, some data relating to the services provided by MV1 are stored in land master charger vehicle module 406, as these may be reflected in remuneration of service provider 104.

Turning back to step 1010, if V1 does not have sufficient power to reach SS1, then control center instructs V1 to go to P2 in step 1018, as described hereinabove.

Reference is now made to FIG. 11, which is another simplified flow chart 1100 of a method for tracking, locating, recharging or transporting an electric vehicle in transit, in accordance with an embodiment of the present invention.

User 102 is driving his vehicle 120, V1 when the power level in battery pack 128 reaches a certain low level thereby activating alarm 123, when the vehicle is at a position P1, in an alarm activating step 1102.

Driver of V1 contacts control center 110 in a contacting step 1104. The alarm transmission may automatically activate positioning system 124 of V1 to determine the current position of V1 and relay it to the control center. The position data received by the control center may be stored in real-time positioning module 402 and the alarm data in the electric vehicle module 408, for example.

In a service station 140 (SS) checking step 1106, the control center checks to see if V1 is can reach an SS.

If the outcome of checking step 1106 is yes, then in a user instructing step 1108, the control center (CC) contacts user 102 by means of his mobile device, for example to go to SS1 (and in a vehicle traveling step 1109, not shown, V1 goes to the service station SS1 in his vicinity.

In a vehicle battery charging step 1110 SS1 140 charges the battery pack 128 of vehicle 120. User 102 can thus continue along his route to his destination.

Details of the amount of power provided, distance traveled by the master vehicle and data pertaining to the time of day and week are relayed to the control center. The data may be stored in the energy provision module 414 and user account module 422, for example. Additionally, some data relating to the services provided by SS1 are stored in service station module 412, as these may be reflected in remuneration of service station 140.

Turning back to step 1106, if MV1 is closer to V1 than SS1 (no at step 1106), then the control center may perform another checking step 1114 to see if MV can reach V1 in a predetermined period of time. If yes, in a master vehicle sending step 1116, the control center sends master vehicle 150 to V1 at P1.

After both the master vehicle and V1 are at the first position P1, the master vehicle 150 charges the battery pack 128 of vehicle 120 at position 1 in a charging step 1118. User 102 can thus continue along his route to his destination.

Details of the amount of power provided, distance traveled by the master vehicle and data pertaining to the time of day and week are relayed to the control center. The data may be stored in the energy provision module 414 and user account module 422, for example. Additionally, some data relating to the services provided by MV1 are stored in land master charger vehicle module 406, as these may be reflected in remuneration of service provider 104.

Turning back to step 1114, if MV1 cannot reach V1 within the predetermined period of time, then the control center sends a breakdown vehicle to V1 at P1 in a BBV sending step 1122.

When BDV reaches V1 at P1, it checks to see if it can charge V1 in a checking step 1124.

If yes, the BDV vehicle 130 charges the battery pack 128 of vehicle 120 at position 1, in a battery charging step 1126.

Turning back to step 1124, if the BDV cannot charge the battery pack 128 of vehicle 120, due to, for example a mechanical fault in the battery pack or battery defect, such as a leak, then BDV transports V1 to a service station, MV or garage in transportation step 1130.

In a battery charging/repairing step 1132, the SS/MV charges the battery and/or replaces it and/or repairs the damaged/faulty parts.

In some cases, V1 will run out of power en route. Various methods for assisting user 102 are described with respect to FIG. 12. FIG. 12 is another simplified flow chart 1200 of a method for tracking, locating, recharging or transporting an electric vehicle in transit, in accordance with an embodiment of the present invention.

User 102 is driving his vehicle 120, V1 when the power level in battery pack 128 reaches zero and it runs out of power, such as due to a battery fault, in a 'out of power" step 1202 when the vehicle is at a position P1, The vehicle stops and thereby activating alarm 123. Alarm 123 transmits a signal to control center 110, in an alarm transmission step 1204. The alarm transmission may automatically activate positioning system 124 of V1 to determine the current position of V1 and relay it to the control center. The position data received by the control center may be stored in real-time positioning module 402 and the alarm data in the electric vehicle module 408, for example.

Thereafter, the control center checks to see if a master vehicle can reach V1 within a predetermined period of time, such as twenty minutes in checking step 1206.

If yes, the control center sends MV1 to the current position of V1 at first position P1, in a MV sending step 1208.

After both the master vehicle and V1 are at the first P1, the master vehicle 150 charges the battery pack 128 of vehicle 120 at position 1 in a charging step 1210.

User 102 can thus continue along his route to his destination.

Details of the amount of power provided, distance traveled by the master vehicle and data pertaining to the time of day and week are relayed to the control center. The data may be stored in the energy provision module 414 and user account module 422, for example. Additionally, some data relating to the services provided by MV1 are stored in land master charger vehicle module 406, as these may be reflected in remuneration of service provider 104.

Turning back to step 1206, if the MV cannot reach V1 within 20 minutes (no at step 1206), the control center performs a second checking step 1214 to see if a BDV can reach V1 within a second predetermined period of time, such as thirty minutes.

If yes, then the control center sends a breakdown vehicle to V1 at P1 in a BBV sending step 1216.

The BDV vehicle 130 then picks up and tows/transports V1 at P1 to one of a service station and a MV, in a transportation step 1218.

SS or MV then charges the battery pack 128 of vehicle 120, in a battery charging step 1220.

Turning back to checking step 1214, if the control center notes that BDV cannot reach V1 within 30 minutes (no in step 1214), the control center proceeds to contact user 102 of V1 in a contacting step 1224.

Thereafter, the control center, for example, calls an external breakdown service (BS) in step 1226.

The BS then brings V1 to SS or to a garage in a V1 transportation step 1228.

The above examples of methods for charging electric vehicles exemplify the system of the present invention, which does not leave any vehicle user "in the field" for extended lengths of time. The system of the present invention further serves to provide an efficient service which enables electric vehicle users to travel long distances without fear of getting stuck.

Other suitable operations or sets of operations may be used in accordance with some embodiments. Some operations or sets of operations may be repeated, for example, substantially continuously, for a pre-defined number of iterations, or until one or more conditions are met. In some embodiments, some operations may be performed in parallel, in sequence, or in other suitable orders of execution Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments may take the form of an entirely hardware embodiment, an entirely software embodiment, or an embodiment including both hardware and software elements. Some embodiments may be implemented in software, which includes but is not limited to firmware, resident software, microcode, or the like.

Some embodiments may utilize client/server architecture, publisher/subscriber architecture, fully centralized architecture, partially centralized architecture, fully distributed architecture, partially distributed architecture, scalable Peer to Peer (P2P) architecture, or other suitable architectures or combinations thereof.

Some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be or may include an electronic, magnetic, optical, electromagnetic, InfraRed (IR), or semiconductor system (or apparatus or device) or a propagation medium. Some demonstrative examples of a computer-readable medium may include a semiconductor or solid state memory, magnetic tape, a removable computer diskette, a Random Access Memory (RAM), a Read-Only Memory (ROM), a rigid magnetic disk, an optical disk, or the like. Some demonstrative examples of optical disks include Compact Disk-Read-Only Memory (CD-ROM), Compact Disk-Read/Write (CD-RAY), DVD, or the like.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Some embodiments may be implemented by software, by hardware, or by any combination of software and/or hardware as may be suitable for specific applications or in accordance with specific design requirements. Some embodiments may include units and/or sub-units, which may be separate of each other or combined together, in whole or in part, and may be implemented using specific, multi-purpose or general processors or controllers. Some embodiments may include buffers, registers, stacks, storage units and/or memory units, for temporary or long-term storage of data or in order to facilitate the operation of particular implementations.

Some embodiments may be implemented, for example, using a machine-readable medium or article which may store an instruction or a set of instructions that, if executed by a machine, cause the machine to perform a method and/or operations described herein. Such machine may include, for example, any suitable processing platform, computing platform, computing device, processing device, electronic device, electronic system, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit; for example, memory, removable or non-removable media, erasable or non-erasable media, writeable or re-writeable media, digital or analog media, hard disk drive, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Functions, operations, components and/or features described herein with reference to one or more embodiments, may be combined with, or may be utilized in combination with, one or more other functions, operations, components and/or features described herein with reference to one or more other embodiments, or vice versa.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flow chart illustrations and/or block diagrams of methods, apparatus (systems) and computer program products according to embodiments of the invention. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow charts and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flow charts and/or block diagram block or blocks.

The flow charts and block diagrams in the Figures illustrate the architecture, functionality, and operation of possible implementations of systems, methods and computer program products according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustrations, and combinations of blocks in the block diagrams and/or flow chart illustrations, can be implemented by special purpose hardware-based systems that perform the specified functions or acts, or combinations of special purpose hardware and computer instructions.

Although the embodiments described above mainly address assessing test coverage of software code that subsequently executes on a suitable processor, the methods and systems described herein can also be used for assessing test coverage of firmware code. The firmware code may be written in any suitable language, such as in C. In the context of the present patent application and in the claims, such code is also regarded as a sort of software code.

The references cited herein teach many principles that are applicable to the present invention. Therefore the full contents of these publications are incorporated by reference herein where appropriate for teachings of additional or alternative details, features and/or technical background.

It is to be understood that the invention is not limited in its application to the details set forth in the description contained herein or illustrated in the drawings. The invention is capable of other embodiments and of being practiced and carried out in various ways. Those skilled in the art will readily appreciate that various modifications and changes can be applied to the embodiments of the invention as hereinbefore described without departing from its scope, defined in and by the appended claims.

The invention claimed is:

1. A computer-controlled electric battery charging system for charging a battery of a roaming electric vehicle, the system comprising:
   a) an electric vehicle comprising at least one battery of 1.5 to 200 kWh and a charger connector electrically coupled to said at least one battery for enabling charging of said at least one battery, wherein movement of the electric vehicle is powered exclusively by said at least one battery;
   b) a master charger vehicle, capable of independent movement, for traveling to the electric vehicle and for charging the at least one battery of the electric vehicle, the master charger vehicle comprising:
      i) a master battery module;
      ii) an electricity converter module adapted to convert output power from said master battery module to input power suitable for provision to said at least one battery;
      iii) a connection and transfer module adapted to connect to said charger connector and to transfer said input power from said electricity converter module to said at least one battery, wherein said connection and transfer module further comprises a fast charging transfer device and wherein said charger connector of said electric car further comprises a fast charging socket, such that said connection and transfer module is adapted to transfer said input power from said electricity converter module to said at least one battery of said electric vehicle through fast charging to charge 70-100% of said at least one battery within one hour; and
      iv) an engine enabling locomotive movement for independent motion of said master charger vehicle;
      wherein said master charger vehicle further comprises a standard vehicle having standard vehicle functions and a separate charging module, wherein said separate charging module comprises said master battery module, said electricity converter module adapted to convert output power from said master battery module to input power suitable for provision to said at least one battery, and said connection and transfer module adapted to transfer said input power from said electricity converter module to said at least one battery; wherein said separate charging module is suitable for retrofitting said standard vehicle; and
   c) a control system in communication with said at least one electric vehicle and said master charger vehicle to enable said master charger vehicle to reach said electric vehicle, wherein said master battery module is adapted to charge said at least one battery with said at least one battery disposed in said electric vehicle; wherein said control system is configured to:
      receive a communication from said electric vehicle regarding a status of a battery of 1.5 to 200 kWh of said electric vehicle;
      determine whether a fast charge or a fast discharge of said battery of said electric vehicle is required;
      determine an urgency of said fast charge or fast discharge of said battery of said electric vehicle; and
      send said master charge vehicle to a position selected from the group consisting of:
      i) a current position of said electric vehicle;
      ii) a future projected position of said electric vehicle along a predetermined route;
      iii) a future projected position of said electric vehicle, wherein said at least one battery is anticipated to be at least partially depleted; and
      iv) a future projected position of said electric vehicle, wherein said at least one battery is anticipated to be fully depleted.

2. The computer-controlled electric battery charging system according to claim 1, wherein said electric vehicle is selected from the group consisting of an electric land vehicle, and electric water vehicle and an airborne electric vehicle.

3. The computer-controlled electric battery charging system according to claim 1, wherein said electric land vehicle is selected from the group consisting of an electric motorbike, an electric car, an electric truck, an electric emergency vehicle and an electric army vehicle.

4. The computer-controlled electric battery charging system according to claim 1, wherein said electric water vehicle is selected from the group consisting of an electric boat, an electric yacht, an electric ship, an electric emergency water vehicle and an electric army water vehicle.

5. The computer-controlled electric battery charging system according to claim 1, wherein said master battery module comprises a power rating of 7 to 3000 kWh.

6. The computer-controlled electric battery charging system according to claim 5, wherein said master charger vehicle further comprises at least one of the following:
   a) a control system for controlling the master charger vehicle;
   b) a communication display for displaying communications from at least one of said electric vehicle and said control center;
   c) a positioning system; and
   d) a mobile communication device.

7. The charging system of claim 1, wherein 70-100% of said battery, disposed inside said electric vehicle, is charged by said master charger vehicle within 20 minutes.

8. The charging system of claim 7, wherein 70-100% of said battery, disposed inside said electric vehicle, is charged by said master charger vehicle within 10 minutes.

9. The charging system of claim 8, wherein 70-100% of said battery, disposed inside said electric vehicle, is charged by said master charger vehicle within 5 minutes.

10. The charging system of claim 1, wherein 70-100% of said battery, disposed inside said electric vehicle, is discharged to said master charger vehicle within one hour.

11. The charging system of claim 10, wherein 70-100% of said battery, disposed inside said electric vehicle, is discharged to said master charger vehicle within 20 minutes.

12. The charging system of claim 11, wherein 70-100% of said battery, disposed inside said electric vehicle, is discharged to said master charger vehicle within 10 minutes.

13. The charging system of claim 12, wherein 70-100% of said battery, disposed inside said electric vehicle, is discharged to said master charger vehicle within 5 minutes.

14. A computer-controlled electric battery charging system according to claim 1, further comprising a breakdown vehicle.

15. A computer-controlled electric battery charging system according to claim 14, wherein said breakdown vehicle comprises:
   a) an on-board master battery module adapted to charge said at least one battery; and
   b) an electric vehicle transportation module adapted to convey the electric vehicle onto said transportation module and to transport said electric vehicle to a destination.

16. A computer-controlled electric battery charging system according to claim 15, wherein said breakdown vehicle further comprises:
   a) an electricity converter module adapted to convert output power from said master battery module to input power suitable for provision to said at least one battery; and
   b) a connection and transfer module adapted to transfer said input power from said electricity converter module to said at least one battery.

17. A computer-controlled electric battery charging system according to claim 16, wherein said breakdown vehicle further comprises at least one of the following:
   a) a control system for controlling the master charger vehicle;
   b) a communication display for displaying communications from at least one of said electric vehicle and said control center;
   c) a positioning system; and
   d) a mobile communication device.

18. A method for charging a battery of a roaming electric vehicle, comprising:
   a) providing an electric vehicle comprising at least one battery and a charger connector electrically coupled to said at least one battery for enabling charging of said at least one battery, wherein movement of the electric vehicle is powered exclusively by said at least one battery;
   b) providing a master charger vehicle, capable of independent movement, for traveling to the electric vehicle and for charging the at least one battery of the electric vehicle, the master charger vehicle comprising:
      i) a master battery module;
      ii) an electricity converter module adapted to convert output power from said master battery module to input power suitable for provision to said at least one battery;
      iii) a connection and transfer module adapted to connect to said charger connector and to transfer said input power from said electricity converter module to said at least one battery, wherein said connection and transfer module further comprises a fast charging transfer device and wherein said charger connector of said electric car further comprises a fast charging socket, such that said connection and transfer module is adapted to transfer said input power from said electricity converter module to said at least one battery of said electric vehicle through fast charging; and
      iv) an engine enabling locomotive movement for independent motion of said master charger vehicle; and
   c) providing a control system in communication with said at least one electric vehicle and said master charger vehicle to enable said master charger vehicle to reach said electric vehicle,
   d) receiving a communication by said control system from said electric vehicle regarding a status of a battery of 1.5 to 200 kWh of said electric vehicle;
   e) determining whether a fast charge or a fast discharge of said battery of said electric vehicle is required by said control system;
   f) determining an urgency of said fast charge or fast discharge of said battery of said electric vehicle by said control system;
   g) selecting a master charger vehicle from a plurality of master charger vehicles by said control system according to said urgency;
   h) sending said master charge vehicle to a position selected from the group consisting of:
      i) a current position of said electric vehicle;
      ii) a future projected position of said electric vehicle along a predetermined route;
      iii) a future projected position of said electric vehicle, wherein said at least one battery is anticipated to be at least partially depleted; and
      iv) a future projected position of said electric vehicle, wherein said at least one battery is anticipated to be fully depleted; and
   i) charging 70-100% of said battery, disposed inside said electric vehicle, using said master battery module of said master charger vehicle within one hour;
   wherein said master charger vehicle further comprises a standard vehicle having standard vehicle functions and a separate charging module, wherein said separate charging module comprises said master battery module, said electricity converter module adapted to convert output power from said master battery module to input power suitable for provision to said at least one battery, and said connection and transfer module adapted to transfer said input power from said electricity converter module to said at least one battery; wherein said separate charging module is suitable for retrofitting said standard vehicle.

19. The method of claim 18, wherein said fast charge is required and wherein 70-100% of said battery, disposed inside said electric vehicle, is charged by said master charger vehicle within 20 minutes.

20. The method of claim 19, wherein 70-100% of said battery, disposed inside said electric vehicle, is charged by said master charger vehicle within 10 minutes.

21. The method of claim 20, wherein 70-100% of said battery, disposed inside said electric vehicle, is charged by said master charger vehicle within 5 minutes.

22. The method of claim 18, wherein said fast discharge is required and wherein 70-100% of said battery, disposed inside said electric vehicle, is discharged to said master charger vehicle within one hour.

23. The method of claim 22, wherein 70-100% of said battery, disposed inside said electric vehicle, is discharged to said master charger vehicle within 20 minutes.

24. The method of claim 23, wherein 70-100% of said battery, disposed inside said electric vehicle, is discharged to said master charger vehicle within 10 minutes.

25. The method of claim 24, wherein 70-100% of said battery, disposed inside said electric vehicle, is discharged to said master charger vehicle within 5 minutes.

26. The method of claim 18, wherein said separate charging module is suitable for retrofitting the standard vehicle and is independent of the vehicle manufacturer or vehicle model.

27. The charging system of claim 1, further comprising a payment system to enable a user of an electric vehicle to pay for charging said at least one battery.

28. The charging system of claim 27, wherein said payment system is further adapted to enable said user to pay for receiving of an electric vehicle to pay for charging said at least one battery.

29. A computer-controlled electric battery charging system for charging the batteries of a plurality of roaming electric vehicles, the system comprising:
   a) a plurality of electric vehicles each comprising at least one battery of 1.5 to 200 kWh and a charger connector electrically coupled to said at least one battery for enabling charging of said at least one battery, wherein movement of each of said plurality of electric vehicles is powered exclusively by said at least one battery;
   b) a plurality of master charger vehicles, each capable of independent movement, for traveling to at least one of said plurality of electric vehicles and for charging the at least one battery of said at least one of said plurality of electric vehicles, each master charger vehicle comprising:
      i) a master battery module;
      ii) an electricity converter module adapted to convert output power from said master battery module to input power suitable for provision to said at least one battery;
      iii) a connection and transfer module adapted to connect to said charger connector and to transfer said input power from said electricity converter module to said at least one battery, wherein said connection and transfer module further comprises a fast charging transfer device and wherein said charger connector of each of said plurality of electric vehicles further comprises a fast charging socket, such that said connection and transfer module is adapted to transfer said input power from said electricity converter module to said at least one battery of said at least one of said plurality of electric vehicles through fast charging; and
      iv) an engine enabling locomotive movement for independent motion of each of said plurality of master charger vehicles;
      wherein each of said plurality of master charger vehicles further comprises a standard vehicle having standard vehicle functions and a separate charging module, wherein said separate charging module comprises said master battery module, said electricity converter module adapted to convert output power from said master battery module to input power suitable for provision to said at least one battery, and said connection and transfer module adapted to transfer said input power from said electricity converter module to said at least one battery; wherein said separate charging module is suitable for retrofitting said standard vehicle; and
   c) a control system in communication with said plurality of electric vehicles and said plurality of master charger vehicles to enable at least one of said plurality of master charger vehicles to reach at least one said plurality of electric vehicles, wherein said master battery module is adapted to charge said at least one battery with said at least one battery disposed in said at least one of said plurality of electric vehicles; wherein said control system is configured to:
      i) receive a communication from said at least one of said plurality of electric vehicles regarding a status of a battery of 1.5 to 200 kWh of said at least one of said plurality of electric vehicles;
      ii) determine whether a fast charge or a fast discharge of said battery of said at least one of said plurality of electric vehicles is required;
      iii) determine an urgency of said fast charge or fast discharge of said battery of said at least one of said plurality of electric vehicles;
      iv) choose one of said plurality of master charger vehicles as a chosen master charger vehicle to send to said at least one of said plurality of electric vehicles; and
      v) send said chosen master charge vehicles to a position selected from the group consisting of:
         i. a current position of said at least one of said plurality of electric vehicles;
         ii. a future projected position of said at least one of said plurality of electric vehicles along a predetermined route;
         iii. a future projected position of said at least one of said plurality of electric vehicles, wherein said at least one battery is anticipated to be at least partially depleted; and
         iv. a future projected position of said at least one of said plurality of electric vehicles, wherein said at least one battery is anticipated to be fully depleted.

\* \* \* \* \*